United States Patent
Kizu et al.

(10) Patent No.: US 9,857,594 B2
(45) Date of Patent: Jan. 2, 2018

(54) OPTICAL DEVICE AND HEAD-MOUNTED DISPLAY DEVICE AND IMAGING DEVICE EQUIPPED WITH THE SAME

(71) Applicant: KABUSHIKI KAISHA TOSHIBA, Minato-ku, Tokyo (JP)

(72) Inventors: Yuko Kizu, Kanagawa (JP); Yukio Kizaki, Kanagawa (JP); Honam Kwon, Kanagawa (JP); Machiko Ito, Kanagawa (JP); Risako Ueno, Tokyo (JP); Mitsuyoshi Kobayashi, Tokyo (JP); Koichi Ishii, Kanagawa (JP); Satoshi Takayama, Kanagawa (JP); Tsutomu Nakanishi, Kanagawa (JP); Takashi Sasaki, Kanagawa (JP); Ryosuke Nonaka, Kanagawa (JP); Tomoya Tsuruyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/009,989

(22) Filed: Jan. 29, 2016

(65) Prior Publication Data
US 2016/0223817 A1 Aug. 4, 2016

(30) Foreign Application Priority Data

Jan. 29, 2015 (JP) ................................ 2015-015705
Feb. 4, 2015 (JP) ................................ 2015-020715
Sep. 14, 2015 (JP) ................................ 2015-180533

(51) Int. Cl.
G02B 13/16 (2006.01)
H04N 5/225 (2006.01)
(Continued)

(52) U.S. Cl.
CPC ....... G02B 27/0172 (2013.01); G02B 3/0056 (2013.01); G02B 3/0087 (2013.01);
(Continued)

(58) Field of Classification Search
CPC .............. G02B 27/0172; G02B 3/0087; G02B 3/0056; G02B 2027/0118; G02F 1/13318;
(Continued)

(56) References Cited

U.S. PATENT DOCUMENTS

2002/0089467 A1* 7/2002 Hara .................... G02B 27/017
345/4
2007/0002453 A1 1/2007 Munro
(Continued)

FOREIGN PATENT DOCUMENTS

JP 10-239676 9/1998
JP 11-109304 4/1999
(Continued)

OTHER PUBLICATIONS

Wetzstein, et al. "Tensor Displays: Compressive Light Field Synthesis using Multilayer Displays with Directional Backlighting", ACM trans. Graph. (SIGGRAPH), Jan. 2012.
Lanman, et al. "Beyond Parallax Barriers: Applying Formal Optimization Methods to Multi-Layer Automultiscopic Displays", proc. SPIE 8288, 2012.

*Primary Examiner* — Yogesh Aggarwal
(74) *Attorney, Agent, or Firm* — Amin, Turocy & Watson LLP

(57) ABSTRACT

An optical device includes a light-shielding layer and a microlens array. The light-shielding layer includes a plurality of openings. The microlens array is divided into a plurality of microlenses corresponding to the respective plurality of openings. A refractive index of the microlens array is variable so that light is incident on the microlenses (Continued)

is focused on the respective plurality of openings. A portion where light is focused includes a central position of the corresponding opening.

19 Claims, 24 Drawing Sheets

(51) Int. Cl.
  *G02B 27/01* (2006.01)
  *G02F 1/29* (2006.01)
  *G02B 3/00* (2006.01)
  *G02F 1/1335* (2006.01)
  *G02F 1/133* (2006.01)

(52) U.S. Cl.
  CPC .... *G02F 1/13318* (2013.01); *G02F 1/133512* (2013.01); *G02F 1/29* (2013.01); *H04N 5/2254* (2013.01); *G02B 2027/0118* (2013.01); *G02F 2001/294* (2013.01)

(58) Field of Classification Search
  CPC ............... G02F 1/133512; G02F 1/29; G02F 2001/294; H04N 5/2254; H05K 7/20927; H05K 7/20872
  USPC ..... 348/222.1, 335, 340, 345, 348, 350, 352
  See application file for complete search history.

(56) References Cited

U.S. PATENT DOCUMENTS

| | | | | |
|---|---|---|---|---|
| 2009/0256225 | A1* | 10/2009 | Nakai | ............... H01L 27/14623 257/432 |
| 2010/0066812 | A1* | 3/2010 | Kajihara | ................ G03B 15/00 348/46 |
| 2010/0214635 | A1 | 8/2010 | Sasaki et al. | |
| 2015/0268476 | A1 | 9/2015 | Nonaka et al. | |
| 2016/0025989 | A1 | 1/2016 | Sasaki et al. | |

FOREIGN PATENT DOCUMENTS

| | | |
|---|---|---|
| JP | 11-513129 | 11/1999 |
| JP | 2004-004616 | 1/2004 |
| JP | 2005-260545 | 9/2005 |
| JP | 2009-500662 | 1/2009 |
| JP | 2009-128565 | 6/2009 |
| JP | 2009-251194 | 10/2009 |
| JP | 2011-071973 | 4/2011 |
| JP | 2014-026058 | 2/2014 |
| JP | 2014-041274 | 3/2014 |
| JP | 2015-195551 | 11/2015 |
| JP | 2016-29426 | 3/2016 |
| WO | 96/41227 | 12/1996 |
| WO | 2007/099948 | 9/2007 |
| WO | 2015-040822 | 3/2015 |

* cited by examiner

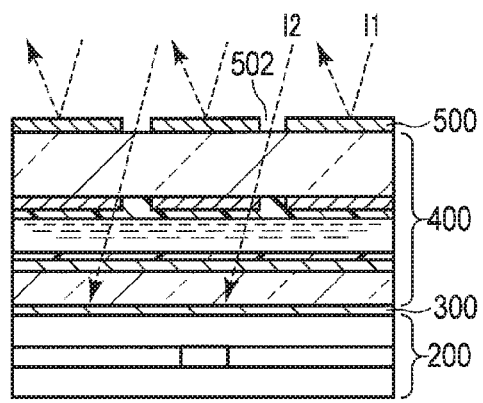
F I G. 3A
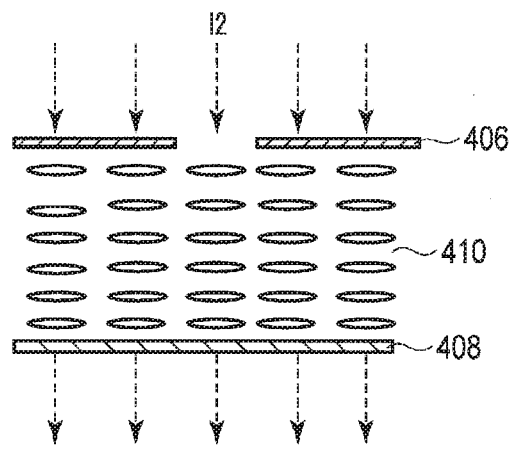
F I G. 3B
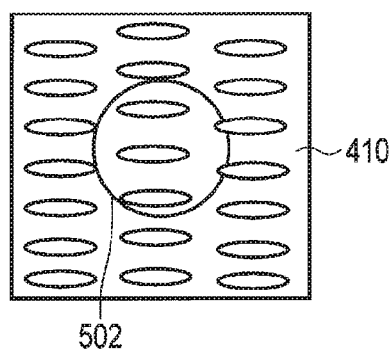
F I G. 3C

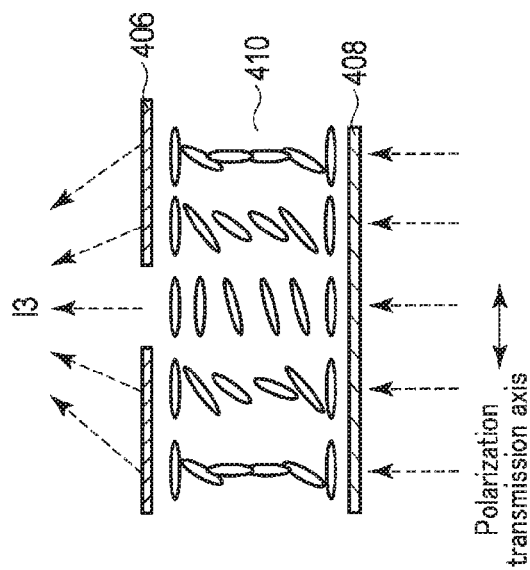
F I G. 4A
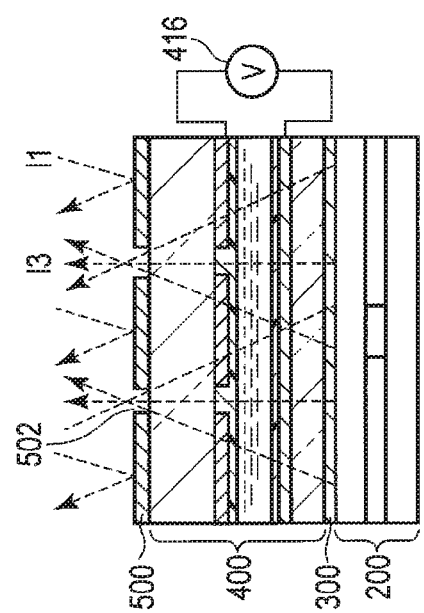
F I G. 4B
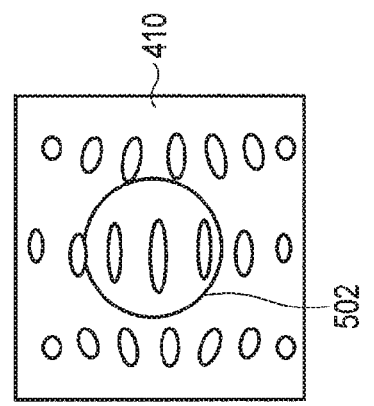
F I G. 4C

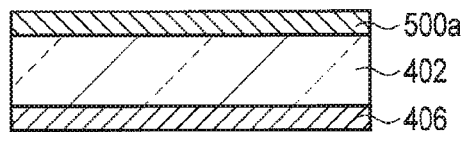
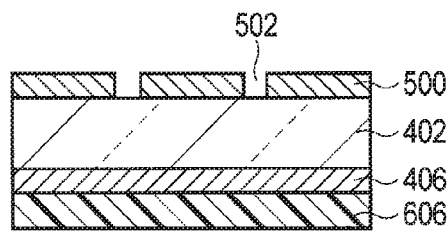
F I G. 8A  F I G. 8B
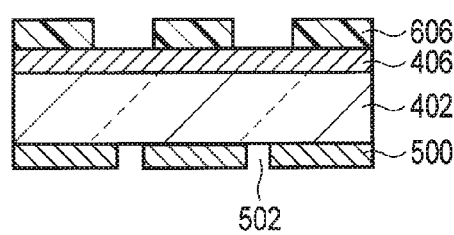
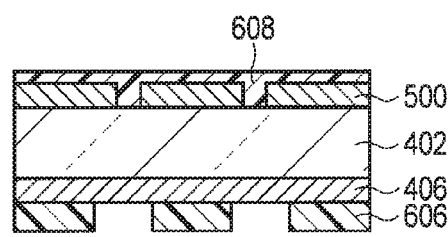
F I G. 8C  F I G. 8D
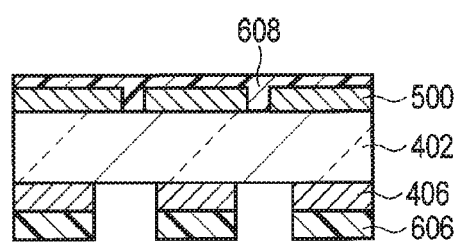
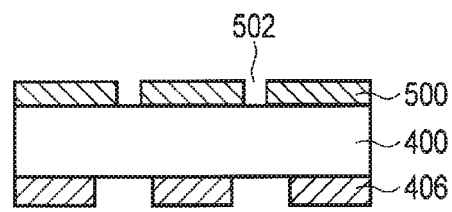
F I G. 8E  F I G. 8F

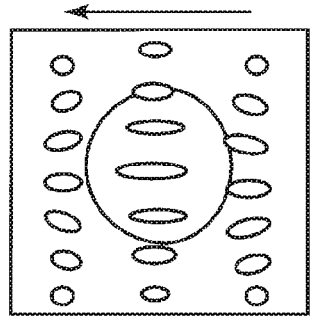
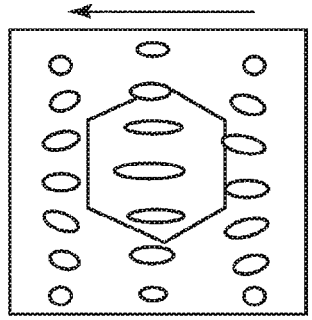
FIG. 11A    FIG. 11B
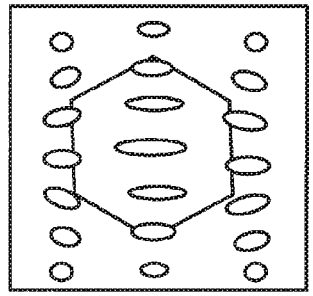
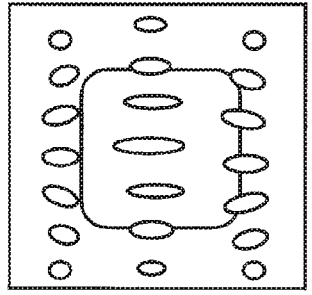
FIG. 11C    FIG. 11D
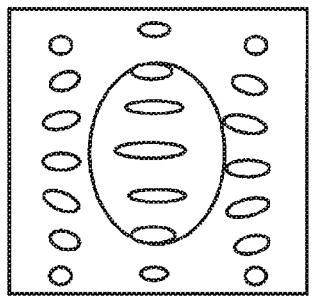
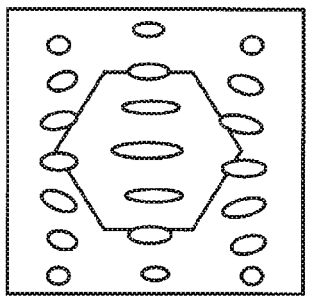
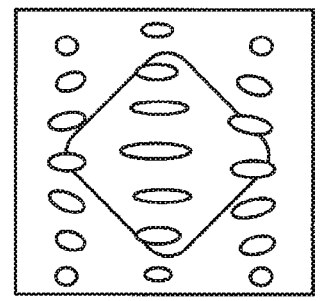
FIG. 11E    FIG. 11F    FIG. 11G

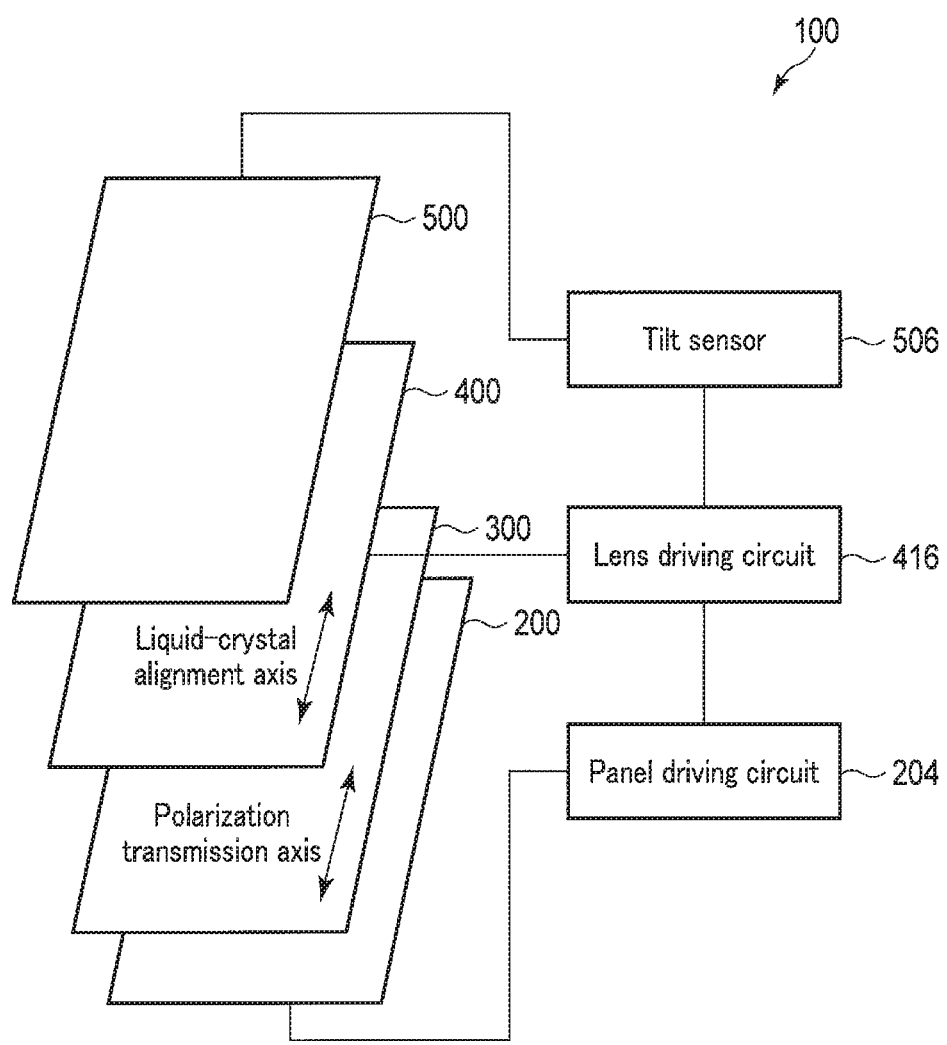
F I G. 13

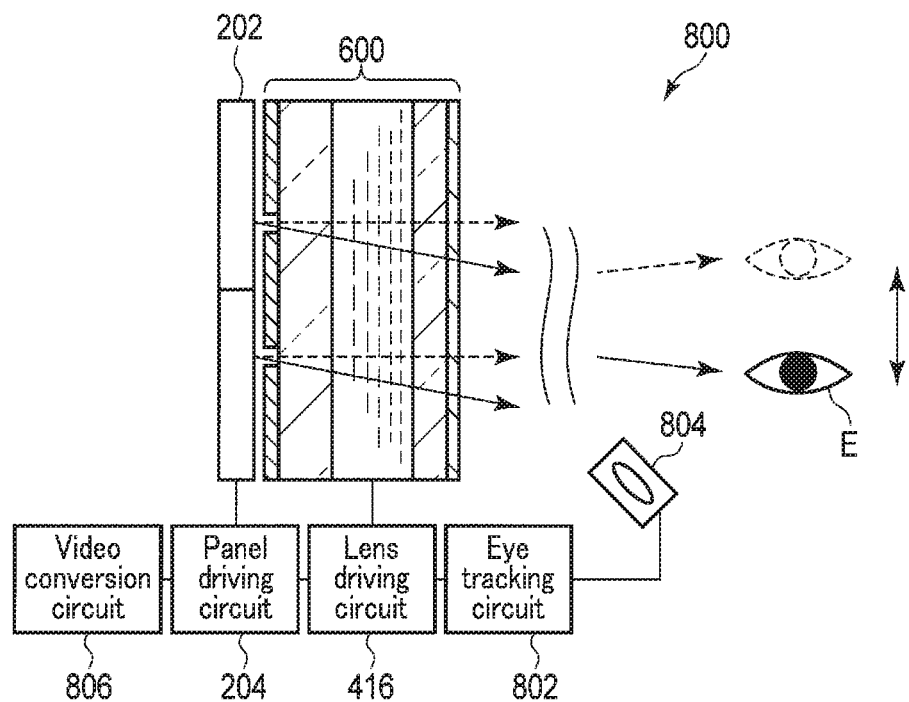
F I G. 22A
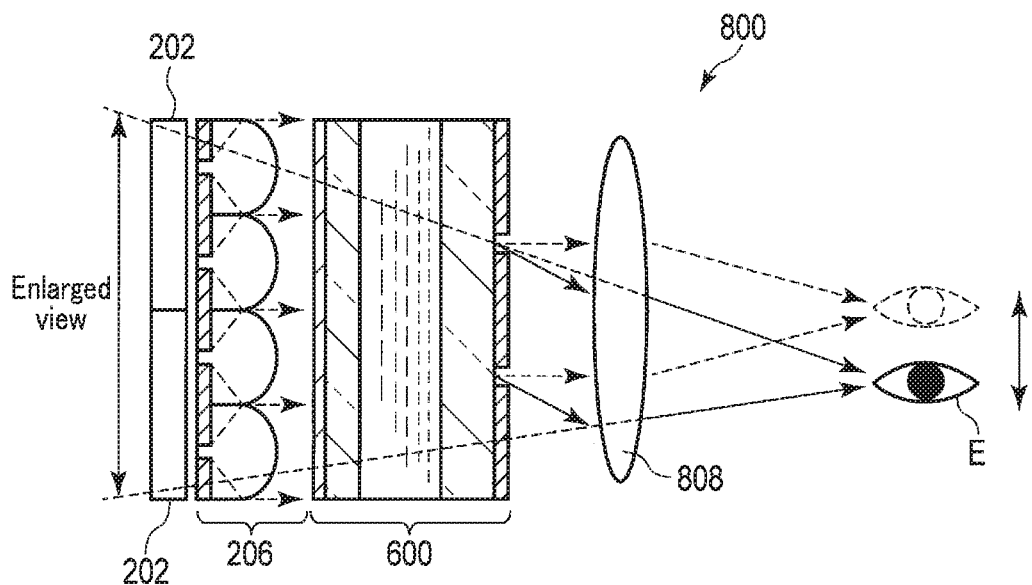
F I G. 22B

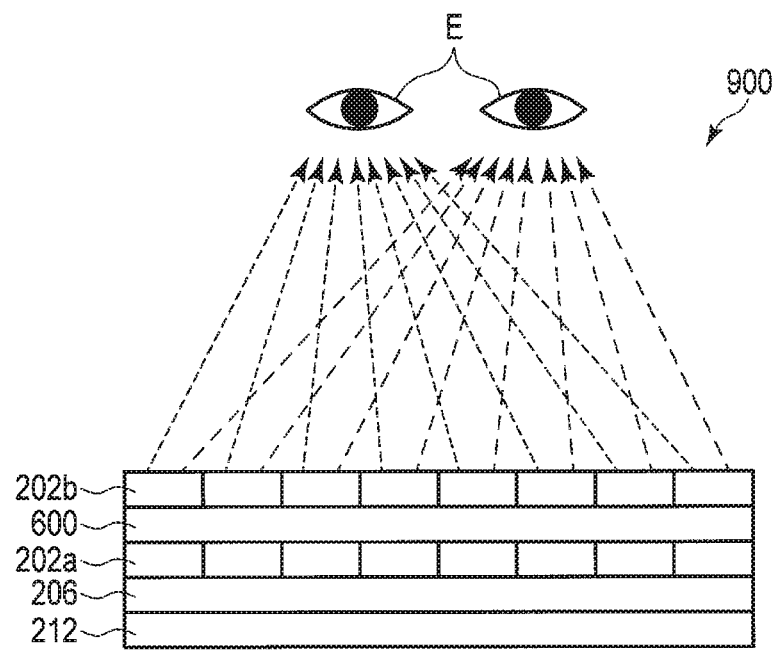
F I G. 23
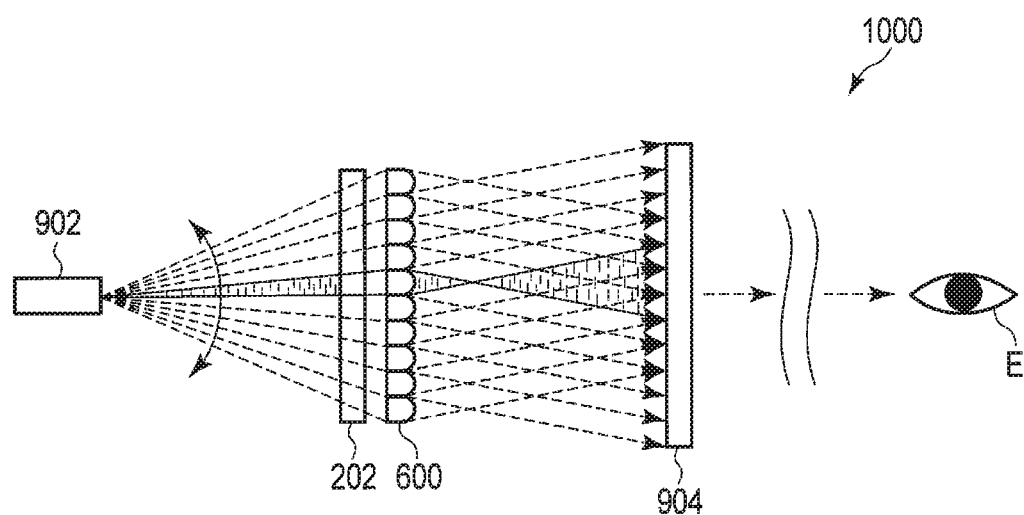
F I G. 24

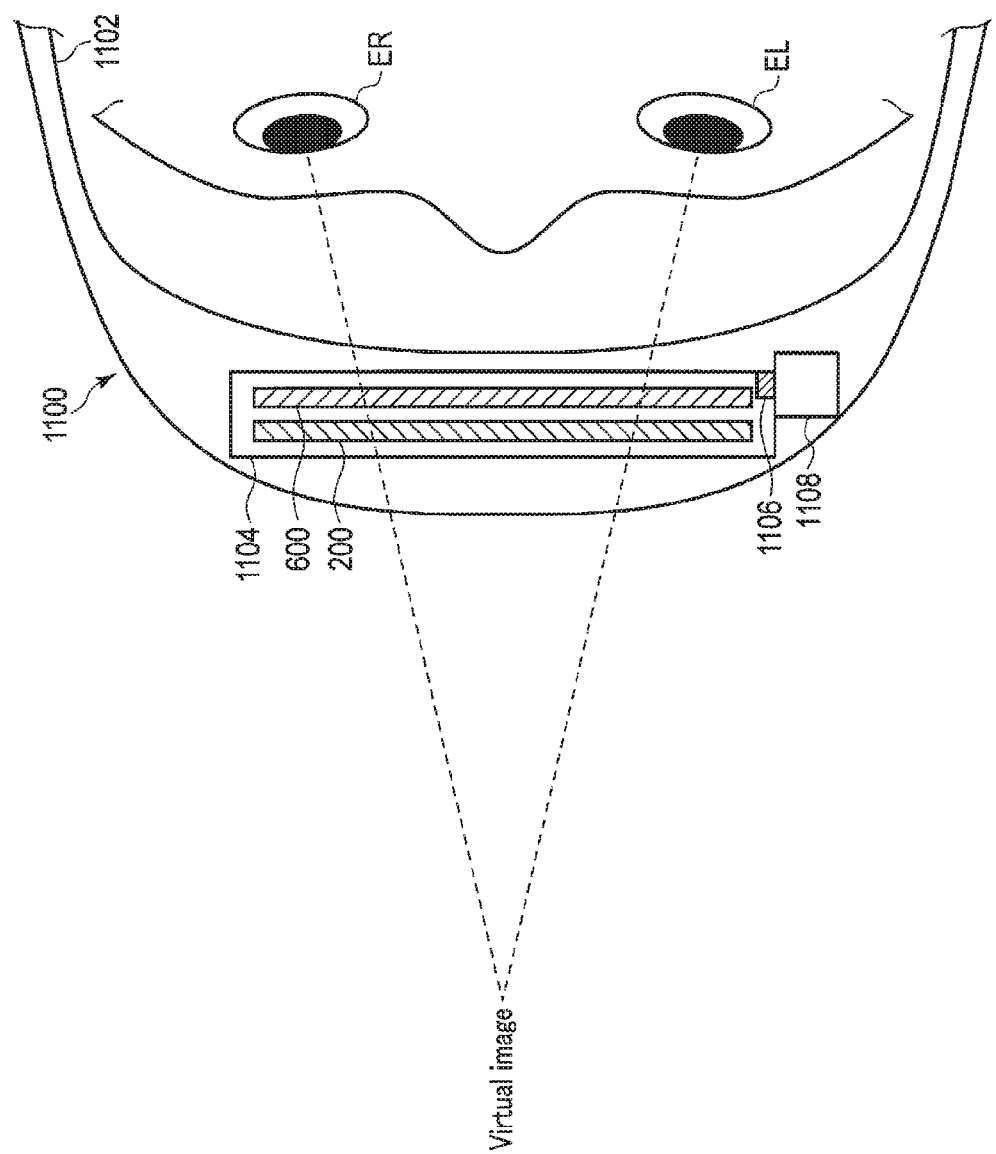
F I G. 25A

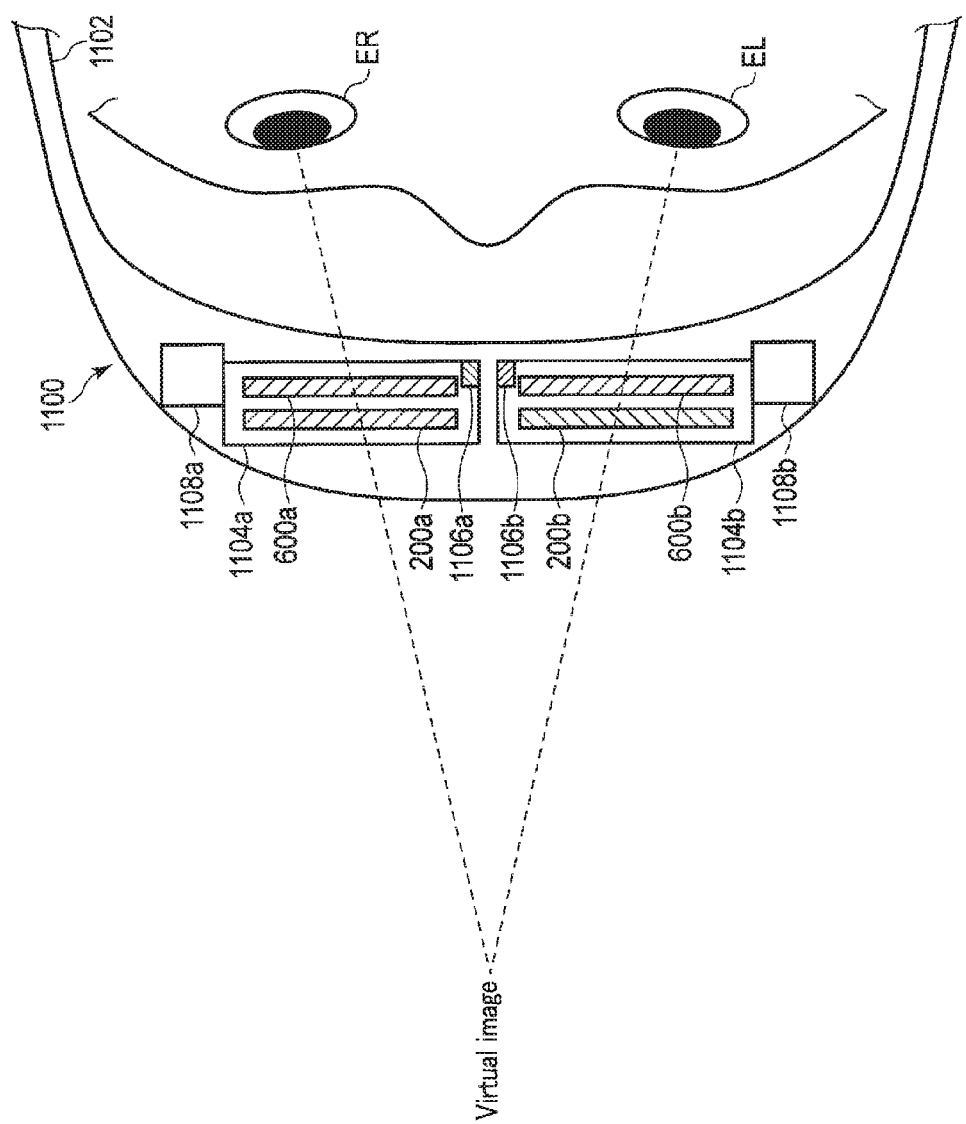
F I G. 25B

OPTICAL DEVICE AND HEAD-MOUNTED DISPLAY DEVICE AND IMAGING DEVICE EQUIPPED WITH THE SAME

CROSS-REFERENCE TO RELATED APPLICATIONS

This application is based upon and claims the benefit of priority from the Japanese Patent Application No. 2015-015705, filed Jan. 29, 2015, No. 2015-020715, filed Feb. 4, 2015, and No. 2015-180533, filed Sep. 14, 2015, the entire contents of all of which are incorporated herein by reference.

FIELD

Embodiments described herein relate to an optical device and a head-mounted display device and an imaging device with the optical device.

BACKGROUND

Display devices are known in which a display such as a liquid crystal display is installed on a back surface of a rearview mirror or a side mirror in a vehicle and in which a half mirror is provided on a front surface of the rearview mirror or the side mirror. A display device of this type functions as a mirror on which a mirror image is projected when no image is shown on the display, and functions as a display device that allows an image shown on the display to be viewed via the half mirror when the image is shown on the display.

On the other hand, a display device has been proposed which comprises a mirror including a light-shielding film such as a metal reflective film in which a plurality of microscopic openings is formed, a video panel positioned on a back surface of the mirror, and a microlens array located at such a position as allows light emitted from the video panel toward the mirror to be focused at the openings in the light-shielding film. For such a display device, focusing performance is likely to fluctuate according to the manner of bonding the microlens array and the video panel together, and stray light control is difficult.

The present embodiment provides an optical device including a microlens array with focusing positions aligned with the openings in the light-shielding film, and a head-mounted display device and an imaging device equipped with the optical device.

BRIEF DESCRIPTION OF THE DRAWINGS

FIGS. 3A, 3B, and 3C are diagrams illustrating an operation performed by the display device according to the first embodiment with no image displayed on a video panel of the display device;

FIGS. 4A, 4B, and 4C are diagrams illustrating an operation performed by the display device according to the first embodiment with an image displayed on the video panel of the display device;

FIGS. 8A, 8B, 8C, 8D, 8E, and 8F are diagrams schematically illustrating a method for manufacturing a display device according to a fourth embodiment;

FIGS. 11A, 11B, 11C, 11D, 11E, 11F, and 11G are diagrams illustrating directions of a liquid-crystal alignment axis projected on control electrodes;

FIG. 13 is a diagram schematically depicting a display device serving as an application example of an optical device according to an eight embodiment;

FIG. 22A is a diagram depicting a first example of a display device according to a tenth embodiment;

FIG. 22B is a diagram depicting a second example of the display device according to the tenth embodiment;

FIG. 23 is a diagram depicting an example of a display device according to an eleventh embodiment;

FIG. 24 is a diagram depicting an example of a display device according to a twelfth embodiment;

FIG. 25A is a diagram illustrating a first example of a display device according to a thirteenth embodiment; and FIG. 25B is a diagram illustrating a second example of the display device according to the thirteenth embodiment.

DETAILED DESCRIPTION

According to one embodiment, an optical device includes a light-shielding layer and a microlens array. The light-shielding layer includes a plurality of openings. The microlens array is divided into a plurality of microlenses corresponding to the respective plurality of openings. A refractive index of the microlens array is variable so that light is incident on the microlenses is focused on the respective plurality of openings. A portion where light is focused includes a central position of the corresponding opening.

Embodiments will be described below with reference to the drawings.

(First Embodiment)

Figure 1A:
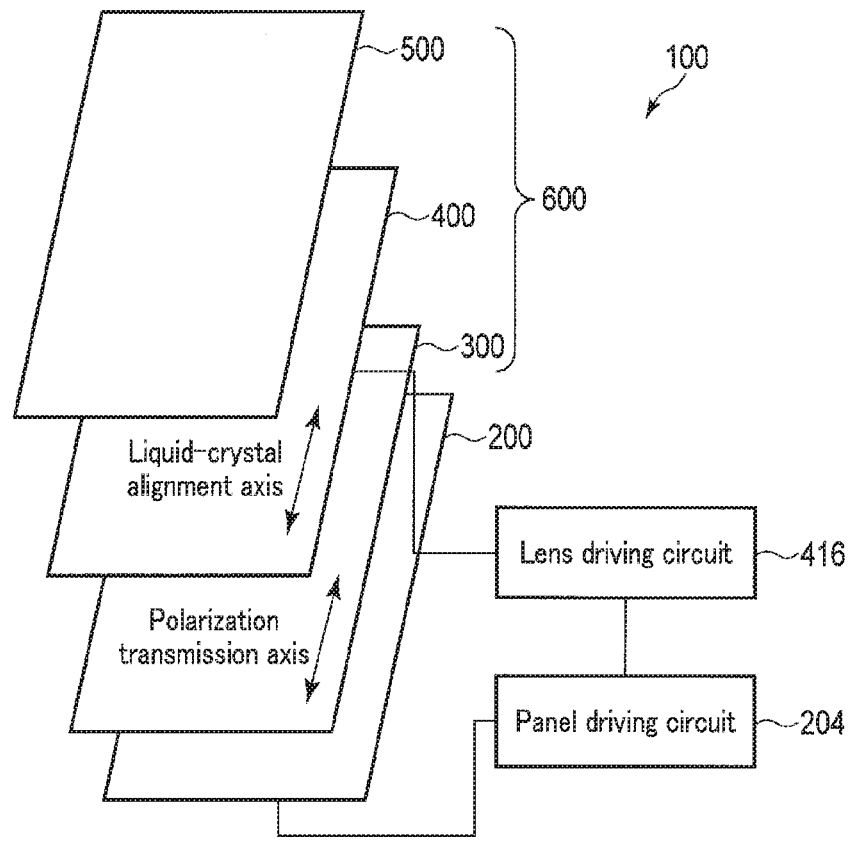
FIG. 1A is a plan view of a display device according to a first embodiment.
Figure 1B:
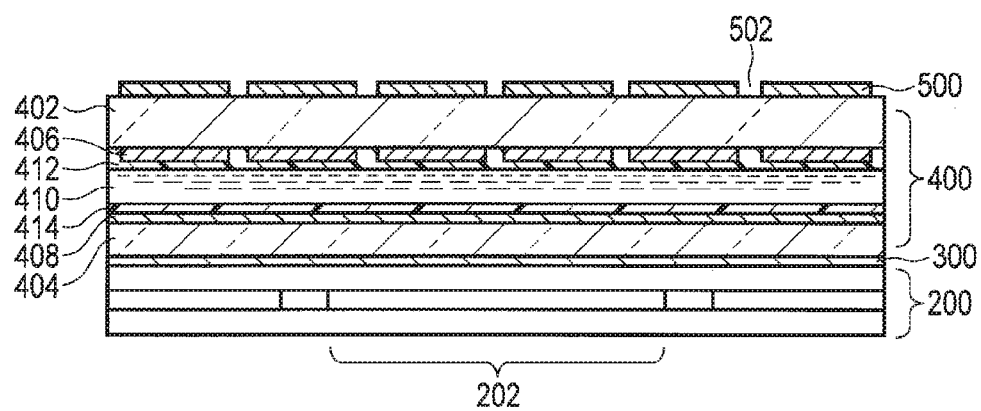
FIG. 1B is a sectional view of the display device according to the first embodiment.

A first embodiment will be described. FIG. 1A is a plan view of a display device serving as an application example of an optical device according to a first embodiment. FIG. 1B is a sectional view of the display device according to the first embodiment. As depicted in FIG. 1A, a display device 100 in the first embodiment includes a video panel 200, a polarizer 300, a microlens array 400, and a light-shielding layer 500. The video panel 200, the polarizer 300, the microlens array 400, and the light-shielding layer 500 are laminated in this order. A protective material, for example, a protective film or a protective substrate, may be provided on the light-shielding layer 500. The polarizer 300, the microlens array 400, and the light-shielding layer 500 are hereinafter collectively referred to as an optical device 600 as needed.

The video panel 200 has a plurality of pixels 202. The pixels are connected to a panel driving circuit 204. The video panel 200 displays, on the pixels 202, an image based on video data sent from the panel driving circuit 204. For example, the video panel 200 is a liquid-crystal display panel. For the liquid-crystal display, the pixels 202 are liquid-crystal pixels each comprising a pixel electrode, a common electrode arranged opposite the pixel electrode, and a liquid-crystal layer sandwiched between the pixel electrode and the common electrode. The pixel 202, for example, changes a transmission state of light entering the video panel 200 through a backlight unit according to the magnitude of a voltage applied to the liquid-crystal layer. When the video panel 200 is configured to enable color display, one pixel 202, for example, corresponds to one color component. The panel driving circuit 204 controls the voltage applied to each of the pixels according to the video data to control a display state of the video panel 200.

The polarizer 300 polarizes light emitted from each of the pixels 202 in the video panel 200. When the video panel 200 is a liquid-crystal display panel, the polarizer 300 may also function as an emission-side polarizer for the video panel 200. On a side of the polarizer 300 closer to the video panel 200, a retardation film may further be provided in order to adjust a transmission axis of outgoing polarized light from the video panel 200. Introduction of the retardation film is effective, for example, when a device design is adopted in which the axis of polarization is different between outgoing light from the video panel 200 and incoming light to the optical device 600.

The microlens array 400, which functions as an optical device along with the light-shielding layer 500, is, for example, a liquid-crystal Gradient Index (GRIN) lens, as is illustrated in FIG. 1B. The microlens array 400 includes a light-shielding-layer-side substrate 402, a panel-side substrate 404, control electrodes 406, a common electrode 408, a liquid-crystal layer 410, and alignment layers 412 and 414. For the microlens array 400, various variable lenses other than the liquid-crystal lens are known, such as a liquid lens, a membrane lens, and an electrowetting lens. Among these lenses, the liquid-crystal lens is preferable in view of a low driving voltage and a capability of forming an array microscopically. The configuration of liquid-crystal lens is roughly classified into a lens frame configuration (a configuration in which liquid-crystal layers are provided between electrode substrates with recesses and protrusions formed on at least one side of each electrode substrate) and a liquid-crystal GRIN lens configuration (a configuration in which liquid-crystal layers are provided between flat electrode substrates with a pattern formed on at least one surface of each electrode substrate). Of these configurations, the liquid-crystal GRIN lens configuration is preferable in view of high transparency when no voltage is applied and ease of manufacturing a large-area lens. The microlens array 400 is hereinafter based on the liquid-crystal GRIN lens configuration.

The light-shielding-layer-side substrate 402 is a substrate to which the light-shielding layer 500 is provided, for example, a glass substrate. The panel-side substrate 404 is arranged opposite the light-shielding-layer-side substrate 402 across the liquid-crystal layer 410. The video panel 200 is stuck to the panel-side substrate 404. The panel-side substrate 404 is also, for example, a glass substrate.

The control electrodes 406 are arranged on the light-shielding-layer-side substrate 402 at positions corresponding to individual openings 502 formed in the light-shielding layer 500. The control electrodes 406 are patterned to have openings corresponding to the openings 502. The control electrodes 406 serves to divide the microlens array 400 into microlenses (lenslets) corresponding to the openings 502 on a one-to-one basis. The common electrode 408 is a planar electrode formed on the panel-side substrate 404 so as to lie opposite to the control electrodes 406. The control electrode 406 and the common electrode 408 are connected to a lens driving circuit 416. The lens driving circuit 416 applies a voltage to the liquid-crystal layer 410 interposed between the common electrode 408 and the control electrodes 406.

The liquid-crystal layer 410 is formed between the light-shielding-layer-side substrate 402 and the panel-side substrate 404. The liquid-crystal layer 410 is divided into portions (microlenses) corresponding to the control electrodes 406 formed so as to correspond on a one-to-one basis to the individual openings 502 formed in the light-shielding layer 500. Each of the microlenses generates a refractive-index distribution upon receiving an applied voltage from the lens driving circuit 416 to change a focusing state of light emitted from the polarizer 300. The alignment layer 412 is formed on the light-shielding-layer-side substrate 402 and on the control electrodes 406 to initially align liquid-crystal molecules in the liquid-crystal layer 410. The alignment layer 414 is formed on the panel-side substrate 404 and on the common electrode 408 to initially align liquid-crystal molecules in the liquid-crystal layer 410. In an example in the present embodiment, the alignment layers 412 and 414 are set to make an alignment axis of the liquid-crystal layer 410 parallel to the transmission axis of the polarizer 300.

The light-shielding layer 500 is, for example, an aluminum reflective layer. In the light-shielding layer 500, one or more openings 502 are formed per pixel 202 in the video panel 200. Light emitted from each of the microlenses is emitted through the corresponding opening 502 to the exterior of the display device 100. External light having entered the display device 100 is reflected by the light-shielding layer 500 or enters the microlens array 400 through the openings 502.

The display device 100 will further be described below. FIGS. 2A to 2I are diagrams schematically illustrating a method for manufacturing the display device 100 according to the first embodiment.

Figure 2A:
FIGS. 2A, 2B, 2C, 2D, 2E, 2F, 2G, 2H, and 2I are diagrams schematically illustrating a method for manufacturing a display device according to the first embodiment.

First, as depicted in FIG. 2A, a substrate such as flat glass is prepared as the light-shielding-layer-side substrate 402. The substrate 402 has an optical thickness (effective thickness considering refractive index) designed so that a focusing position (in the vicinity of a focal or imaging position obtained when the lens function is exhibited) where light is focused by each of the liquid-crystal microlenses in the microlens array 400 includes a central position of the opening 502 defined by the corresponding opening 502. The focusing position where light is focused by each of the liquid-crystal microlenses in the microlens array 400 coincides with a central position of the opening 502 defined by the corresponding opening 502. According to a lens function (concerning optical aberration), adjustment is made between the focusing position and the focal (imaging) position.

Figure 2B:
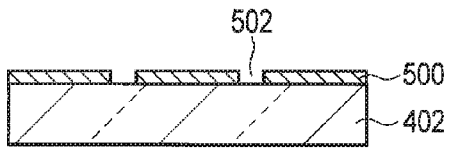

Next, as depicted in FIG. 2B, the light-shielding film 500 such as an aluminum reflective layer is formed on a first principal surface (in FIG. 2B, an upper surface) of the substrate 402. Then, the openings 502 are patterned in the light-shielding layer 500. A ratio between an effective diameter (for circles, the diameter and for other shapes, the equivalent diameter of a circle in terms of area) of the opening 502 and a center-to-center distance between the openings 502 is determined by considering a design value of reflectance for the display device 100, the reflectance of the light-shielding layer, and arrangement of the openings. For example, when the display device 100 has a reflectance (design value) of 65% and the light-shielding layer has a reflectance of 93%, the openings have an aperture ratio of 30%. The ratio of the effective diameter to the center-to-center distance is, for example, 60:35 when the openings are in a hexagonal array, or for example, 60:37 when the openings are in a square array. The reflectance R of the light-shielding layer is calculated based on Expression 1

For the hexagonal array:

$$R = R_0 \left\{ 1 - \frac{\sqrt{3}}{6} \pi \left(\frac{D}{P}\right)^2 \right\}$$

For the square array:

$$R = R_0 \left\{ 1 - \frac{\pi}{4} \left(\frac{D}{P}\right)^2 \right\}$$

Expression 1 where
D: the effective diameter of the opening,
P: the center-to-center distance between the openings, and
$R_0$: the reflectance of the light-shielding layer.

Figure 2C:
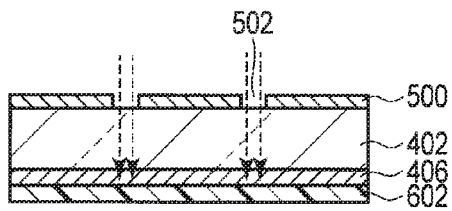

Then, as depicted in FIG. 2C, electrodes such as ITO which serve as the control electrodes 406 are formed on a second principal surface (in FIG. 2C, a lower surface) of the substrate 402. Thereafter, the electrodes 406 are coated with a positive resist 602. Subsequently, the electrodes 406 are exposed, for example, by being irradiated with UV light using the light-shielding layer 500 with the openings 502 formed therein as a mask. The sensitivity of the resist 602 and the wavelength of irradiation are adjusted so as to penetrate the substrate 402.

Figure 2D:
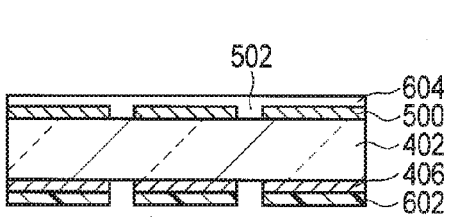

Next, as depicted in FIG. 2D, the light-shielding layer 500 is coated with a protective layer 604. After a developing, openings are formed in the resist 602 at portions corresponding to the openings 502. Thereafter, the electrodes 406 are etched using the resist 602 as a mask. An etching amount may be controlled by etching time. An appropriate setting of the etching amount enables the openings formed in the resist 602 and the electrode 406 smaller or larger than the openings 502.

Figure 2E:
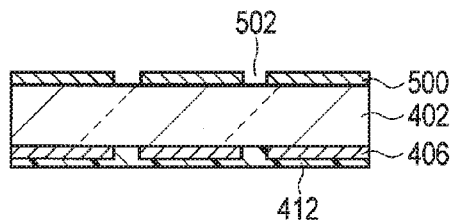

Next, as depicted in FIG. 2E, the resist 602 and the protective layer 604 are removed. Thus, the control electrodes 406 are formed which have substantially the same opening shape as that of the openings 502. A substrate surface including the control electrodes 406 is coated with the alignment layer 412. A liquid-crystal alignment processing method for the alignment layer 412 may be a rubbing method, a photo alignment method, or the like.

Figure 2F:
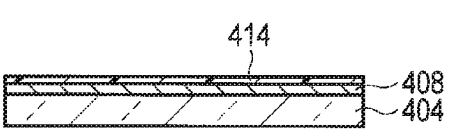

Subsequently to or in parallel with the formation of the light-shielding-layer-side substrate 402 as described above, a substrate such as flat glass which serves as the panel-side substrate 404 is prepared as depicted in FIG. 2F. An electrode such as ITO which serves as the common electrode 408 is formed over the first principal surface (in FIG. 2F, an upper surface) of the substrate 404. Thereafter, the common electrode 408 is coated with the alignment layer 414. The substrate 404 is as thin as possible to the extent that required specifications such as a gas barrier characteristic and the operability of the display device are met.

Figure 2G:
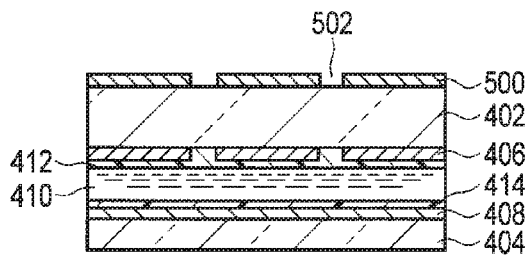

Next, as depicted in FIG. 2G, the light-shielding-layer-side substrate 402 and the panel-side substrate 404 are assembled together so as to place the coated surface of the alignment layer 412 on the light-shielding-film-side substrate 402 opposite to the coated surface of the alignment layer 414 on the panel-side substrate 404. A seal agent not depicted in the drawings is applied to peripheries of one of the substrates in frame form before the assembly. Thereafter, a liquid-crystal material serving as the liquid-crystal layer 410 is sealed between the light-shielding-layer-side substrate 402 and the panel-side substrate 404 to fabricate liquid-crystal GRIN lens cells.

Figure 2H:
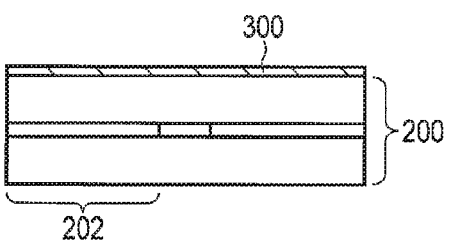

Next, as depicted in FIG. 2H, the video panel 200 is prepared. The polarizer 300 is stuck to the video panel 200 as needed. The transmission axis of the polarizer 300 is desirably parallel to an initial alignment axis of the liquid-crystal layer 410. The transmission axis of the polarizer 300 may cross the initial alignment axis of the liquid-crystal layer 410. However, a crossing angle is desirably 45° or less. Arranging the axes in this manner enables the modulation of refractive index to be maximized when the microlens array 400 is driven as a lens.

Figure 2I:
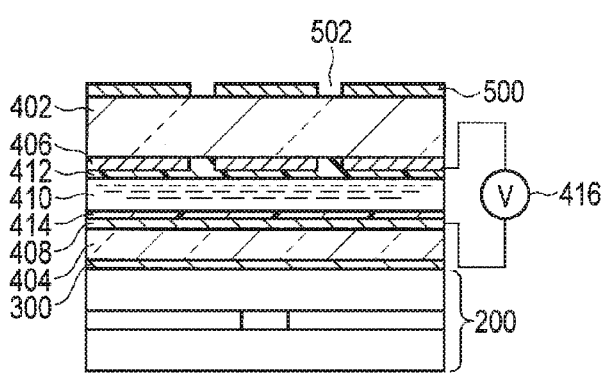

Finally, as depicted in FIG. 2I, the video panel 200 is stuck to a side of the liquid-crystal GRIN lens cells that is closer to the panel-side substrate 404. Thereafter, the lens driving circuit 416 is connected to the microlens array 400, and the panel driving circuit 204 not depicted in the drawings is connected to the video panel 200. Thus, the display device 100 is completed.

Next, operations of the display device 100 in the present embodiment will be described. FIGS. 3A to 3C are diagrams illustrating an operation performed by the display device 100 according to the first embodiment with no image displayed on the video panel 200. As depicted in FIG. 3A, rays 11 from the exterior of the display device 100 are mostly reflected by a surface of the light-shielding layer 500.

Only a small number of rays 12 having passed through the openings 502 enter the interior of the display device 100. A refractive index of the microlens array being variable so that light is incident on the microlenses is focused on the respective plurality of openings. The refractive index for one of the plurality of microlenses is variable independently.

In the present embodiment, while no image is displayed on the video panel 200, no voltage is applied to the liquid-crystal layer 410. FIG. 3B depicts a schematic diagram of a section of the liquid-crystal layer 410 observed when no voltage is applied. FIG. 3C is a schematic distribution map of liquid-crystal molecules with liquid-crystal alignment orientations near the openings 502 projected on the surface. In the example in FIG. 3B and FIG. 3C, the initial alignment of the liquid-crystal molecules in the liquid-crystal layer 410 is horizontal to the substrate.

As depicted in FIG. 3B and FIG. 3C, the liquid-crystal layer 410 is aligned with one direction when no voltage is applied. Therefore, the refractive-index distribution in the liquid-crystal layer 410 is uniform. In this state, the rays 12 having entered the liquid-crystal layer 410 travel straight ahead as depicted in FIG. 3B. When no image is displayed on the video panel 200, the rays 12 having passed through the openings 502 travel straight ahead through the liquid-crystal layer 410 and are then absorbed by the polarizer 300, or are trapped inside the display device 100 and attenuated while being subjected to multiple reflections. Therefore, the openings 502 are very small black regions and are not perceived by a viewer. Spatial resolution of human vision is 1/16 mm (62.5 μm). When the typical dimension of each of the openings 502 is equal to or smaller than the value of the spatial resolution, the opening 502 is reliably prevented from being perceived. When no voltage is applied, the black region has a low contrast with peripheries and is reliably prevented from being perceived even if the dimension exceeds the value of the spatial resolution. An antireflection film formed on a display surface of the video panel 200 enables a further reduction of light emitted from the interior of the display device 100.

Thus, while no image is displayed on the video panel 200, no light is emitted from the interior of the display device 100 and light from the exterior of the display device 100 is reflected by the light-shielding layer 500. Therefore, with no image displayed on the video panel 200, the display device 100 functions as a normal mirror. In this case, a mirror image with no color shift is projected on the light-shielding layer 500 of the display device 100.

FIGS. 4A to 4C are diagrams illustrating an operation performed by the display device 100 according to the first embodiment with an image displayed on the video panel 200. As depicted in FIG. 4A, the rays 11 from the exterior of the display device 100 are reflected by the surface of the light-shielding layer 500. The rays 12 passing through the openings 502 are also present in an example in FIGS. 4A to 4C as is the case with the example in FIGS. 3A to 3C. However, the number of the rays 12 is smaller than the number of the other rays, and thus, the rays 12 do not affect a display state of the display device 100 and are not depicted in the drawings.

In the present embodiment, to allow an image to be displayed on the video panel 200, a voltage is applied to the liquid-crystal layer 410. FIG. 4B depicts a schematic diagram of a section of the liquid-crystal layer 410 observed when a voltage is applied. FIG. 4C is a schematic distribution map of liquid-crystal molecules with liquid-crystal alignment orientations near the openings 502 projected on the surface. The liquid-crystal material is hereinafter assumed to have a positive dielectric anisotropy.

As depicted in FIG. 4B, the intensity of vertical electric field is lower immediately below the openings 502 than around the openings 502 because the control electrode 406 is not formed immediately below the openings 502. Thus, the liquid-crystal molecules immediately below the openings 502 maintain a substantially horizontal orientation. On the other hand, the liquid-crystal molecules around the openings 502 are aligned under the effect of electric fields formed between the common electrode 408 and the control electrodes 406 (when the liquid-crystal material has a positive dielectric anisotropy, the major axes of the liquid-crystal molecules are aligned with a tilt direction of the electric fields).

On the other hand, concerning birefringence (anisotropy of the refractive index) of conventional liquid-crystal molecules, the refractive index is relatively high in a major-axis direction of the liquid-crystal molecules and is relatively low in a minor-axis direction of the liquid-crystal molecules. In other words, on the assumption that polarized rays vertically enter the microlens array from below the liquid-crystal layer 410, the refractive index is relatively high when the liquid-crystal molecules are aligned with the horizontal direction and is relatively low when the liquid-crystal molecules are aligned with the vertical direction. Thus, the refractive-index distribution of the liquid-crystal layer 410 causes rays 13 having entered the liquid-crystal layer 410 to be refracted so as to converge toward the openings 502 in the liquid-crystal layer 410. If the optical thickness of the substrate 402 is designed as described above, the rays 13 emitted from the liquid-crystal microlenses in the liquid-crystal layer 410 are focused at the positions of the corresponding openings 502 and emitted through the openings 502 as depicted in FIG. 4A. Adjustment of display luminance of the video panel 200 makes illuminance of an image formed at the openings 502 higher than that of the mirror image formed on the light-shielding layer 500, allowing the viewer to preferentially view the image.

Thus, with an image displayed on the video panel 200, light having a more sufficient illuminance than light reflected by the light-shielding layer 500 is emitted through the openings 502. Therefore, with an image displayed on the video panel 200, the display device 100 functions as an image display device instead of a mirror.

In the present embodiment described above, the microlens array 400 comprises a variable lenses such as liquid-crystal GRIN lenses, allowing easy control of the focusing position of light having entered the microlens array. Moreover, the focusing position of light emitted from the video panel 200 is set at the central position of each of the openings 502, preventing vignetting by the opening 502. This enables maximization of the illuminance of an image emitted through the openings while the image is displayed. In this manner, both the quality of mirror display and the quality of display can be improved.

(Second Embodiment)

Figure 5A:
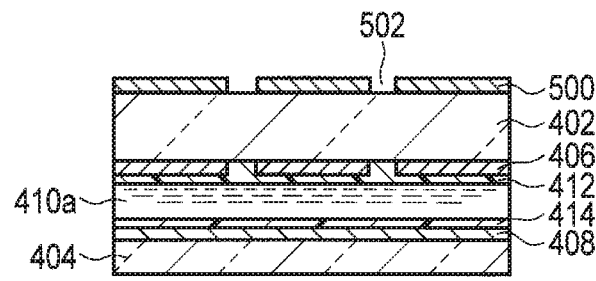
FIGS. 5A and 5B are diagrams schematically illustrating a method for manufacturing a display device according to a second embodiment.
Figure 5B:
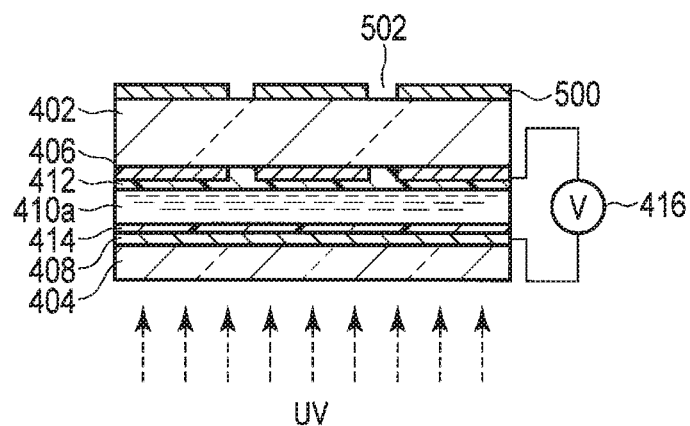

Now, a second embodiment will be described. FIGS. 5A and 5B are diagrams schematically illustrating a method for manufacturing the display device 100 according to the second embodiment. Description of the same process as that illustrated in FIGS. 2A to 2I are omitted as needed.

A process of manufacturing the light-shielding-layer-side substrate 402 is the same as the process illustrated in FIGS. 2A to 2E. A process of manufacturing the panel-side substrate 404 is the same as the process illustrated in FIG. 2F. In the second embodiment, the light-shielding-layer-side substrate 402 and the panel-side substrate 404 are assembled together as manufactured in the first embodiment so as to place the coated surface of the alignment layer 412 opposite to the coated surface the alignment layer 414 (after a seal agent not depicted in the drawings is applied to peripheries of one of the substrates in frame form). Afterwards, a UV-curing liquid-crystalline material serving as a liquid-crystal layer 410a is sealed between the light-shielding-layer-side substrate 402 and the panel-side substrate 404 to form liquid-crystal GRIN lens cells as depicted in FIG. 5A.

Next, with a voltage applied to the liquid-crystal layer 410a to induce a refractive-index distribution, the liquid-crystal layer 410a is irradiated with UV light to stabilize the liquid-crystal molecules in the liquid-crystal layer 410a with the alignment of the liquid-crystal molecules maintained, as depicted in FIG. 5B. Thereafter, the liquid-crystal GRIN lens cells are stuck to the video panel 200 as depicted in FIGS. 2H and 2I. Afterwards, the lens driving circuit 416 is connected to the microlens array 400, and the panel driving circuit 204 not depicted in the drawings is connected to the video panel 200, thus completing the display device 100.

Next, operations of the display device 100 in the present embodiment will be described. Basic operations are similar to the operations described with reference to FIGS. 3A to 3C. However, in the present embodiment, since the alignment of the liquid-crystal molecules in the liquid-crystal layer 410a is stabilized, the liquid-crystal microlens array exhibits a lens function even when no voltage is applied to the liquid-crystal layer 410a. Therefore, even when no image is displayed on the video panel 200 of the display device 100, the trajectories of the rays 12 having passed through the openings 502 change inside the liquid-crystal layer 410a. However, as described above, the openings have a low aperture ratio and the rays 12 have a slight amount of light, and thus, the change is considered to have only an insignificant adverse effect.

As described above, in the present embodiment, the UV curing liquid crystal is used as a liquid-crystal material that allows the liquid-crystal microlens array to be formed. Thus, in addition to the effects described in the first embodiment, elimination of the lens driving circuit 416 can be achieved.

When the display device 100 is manufactured as illustrated in the present embodiment, a quartz substrate is desirably used instead of a glass substrate in order to increase transmittance of UV light during irradiation with UV light. However, the panel-side substrate 404 can be made as thin as possible within the range of required specifications. For the light-shielding-layer-side substrate 402, formation of microscopic openings 502 also allows achieving a short focus when the microlens array 400 exhibits a lens function. In this case, the substrate can be thinned, enabling the transmittance of UV light to be increased even when a glass substrate is used.

(Third Embodiment)

Now, a third embodiment will be described. FIGS. 6A to 6E are diagrams schematically illustrating a method for manufacturing the display device 100 according to the third embodiment.

Figures 6A, 6B:
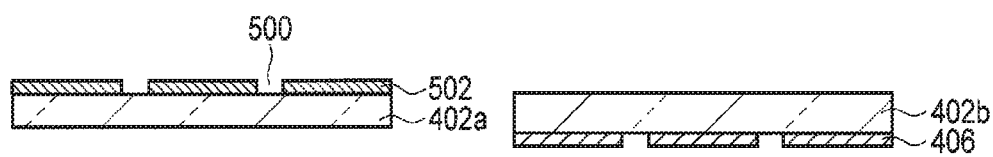
FIGS. 6A, 6B, 6C, 6D, and 6E are diagrams schematically illustrating a method for manufacturing a display device according to a third embodiment.

In the third embodiment, first, a substrate 402a such as flat glass, which functions as a part of a light-shielding-layer-side substrate as depicted in FIG. 6A, is prepared. The substrate has a thickness that is, for example, half the thickness of the substrate 402. Next, as depicted in FIG. 6A, the light-shielding layer 500 such as an aluminum reflective layer is formed on a first principal surface (in FIG. 6A, an upper surface) of the substrate 402a. Then, the openings 502 are patterned in the light-shielding layer 500.

Subsequently to or in parallel with the formation of the substrate 402a, a substrate 402b such as flat glass which serves as the light-shielding-layer-side substrate as depicted in FIG. 6B is prepared. The substrate 402b has a thickness that is, for example, half the thickness of the substrate 402. Then, as depicted in FIG. 6B, electrodes such as ITO which serve as the control electrodes 406 are formed on one of the principal surfaces (in FIG. 6B, the lower surface) of the substrate 402b. Thereafter, the electrodes 406 are masked and etched.

Figures 6C, 6D:
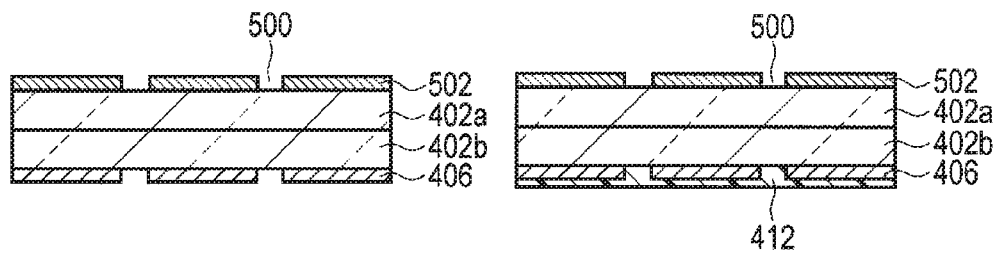
Figure 6E:
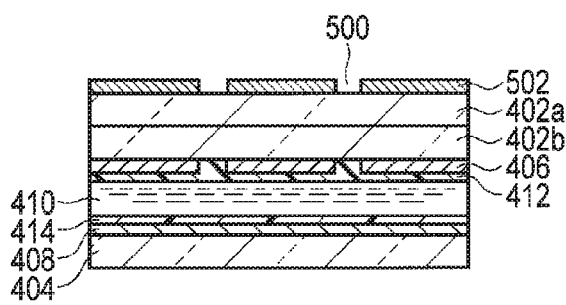

Next, as depicted in FIG. 6C, the other principal surface (lower surface) of the substrate 402a and the other principal surface (upper surface) of the substrate 402b are assembled together while being aligned with each other. The alignment is performed so as to align the central position of each opening 502 with a central position of the corresponding control electrode 406. Then, as depicted in FIG. 6D, the substrate surface including the control electrodes 406 is coated with the alignment layer 412. Next, as is the case with the first embodiment, the panel-side substrate 404 is laminated on the alignment layer 412 as depicted in FIG. 6E. Subsequently, the liquid-crystal material is sealed in the structure to form the liquid-crystal layer 410. A UV curing liquid-crystal material may be used as is the case with the second embodiment. In this case, irradiation with UV light is performed after assembly of the substrates.

In the present embodiment, the openings 502 are formed separately from the control electrodes 406, leading to an increased degree of freedom of shape design.

(Modification of the Third Embodiment)

Next, a modification of the third embodiment will be described. FIGS. 7A to 7F are diagrams schematically illustrating a method for manufacturing the display device 100 as an application example of an optical device according to a variation of the third embodiment.

Figure 7A:
FIGS. 7A, 7B, 7C, 7D, 7E, and 7F are diagrams schematically illustrating a method for manufacturing a display device according to a modification of the third embodiment.
Figure 7B:
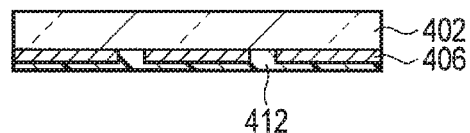

First, the substrate 402 such as flat glass is prepared which functions as a light-shielding-layer-side substrate. Then, as depicted in FIG. 7A, electrodes such as ITO which serve as the control electrodes 406 are formed on one of the principal surfaces (in FIG. 7A, the lower surface) of the substrate 402. Thereafter, the electrodes 406 are masked and etched. Next, as depicted in FIG. 7B, the substrate surface including the control electrodes 406 is coated with the alignment film 412.

Figure 7C:
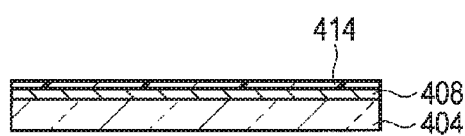

Thereafter, as depicted in FIG. 7C, the panel-side substrate 404 is manufactured. The method for manufacturing the panel-side substrate 404 is similar to that of FIG. 2F.

Figure 7D:
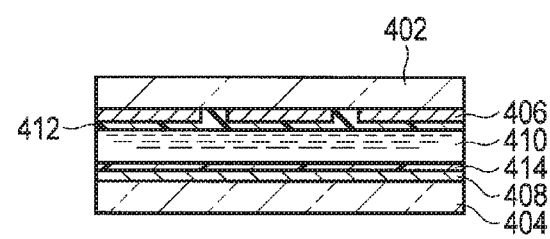

Then, as depicted in FIG. 7D, the light-shielding layer-side substrate 402 and the panel-side substrate 404 are assembled together so as to place the coated surface of the alignment film 412 on the light-shielding-layer-side substrate 402 opposite to the coated surface of the alignment film 414 on the panel-side substrate 404 (after a seal agent not depicted in the drawings is applied to peripheries of one of the substrates in frame form). Thereafter, a liquid-crystal material serving as the liquid-crystal layer 410 is sealed between the light-shielding-layer-side substrate 402 and the panel-side substrate 404 to form liquid-crystal GRIN lens cells. A UV curing liquid-crystal material may be used, as is the case with the second embodiment. In this case, irradiation with UV light is performed after assembly of the substrates.

Figure 7E:
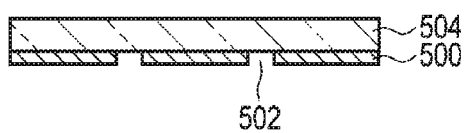

Subsequently to or in parallel with the process as described above, a substrate 504 such as flat glass is prepared. Then, as depicted in FIG. 7E, the light-shielding layer 500 such as an aluminum reflective film is formed on one of the principal surfaces (in FIG. 7E, a lower surface) of the substrate 504. Then, the openings 502 are patterned in the light-shielding layer 500.

Figure 7F:
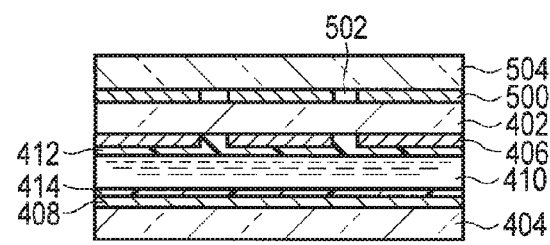

Then, as depicted in FIG. 7F, the other principal surface (upper surface) of the substrate 402 of the liquid-crystal GRIN lens cells and one of the principal surfaces (lower surface) of the substrate 504 are assembled together while being aligned with each other. The alignment is performed so as to align the central position of each opening 502 with the central position of the corresponding control electrode 406.

In the present modification, after the liquid-crystal GRIN lens cells are assembled, the substrate 504 with the light-shielding layer 500 formed thereon is laminated. Such a manufacturing method is effective when the optical thickness of the substrate 402 needs to be reduced in order to shorten the focal distance of the liquid-crystal GRIN lens cells, consequently making simultaneous formation of the control electrodes 406 and the light-shielding layer 500 on the substrate 402 difficult. Moreover, the light-shielding layer 500 is protected by the substrate 504, and a substrate interface portion acts as a mirror surface. Thus, the substrates are processed to allow the reflection characteristics to be easily controlled, enabling deterioration to be suppressed.

In the present modification, the liquid-crystal GRIN lens cells are manufactured before the substrate 504 with the light-shielding layer 500 is laminated. When the video panel 200 is laminated on the liquid-crystal GRIN lens cells and then the substrate 504 is laminated on the video panel 200, the substrate 504 can be laminated while an image displayed on the video panel 200 is being checked.

(Fourth Embodiment)

Next, a fourth embodiment will be described. FIGS. 8A to 8F are diagrams schematically illustrating a method for manufacturing the display device 100 as an application example of an optical device according to the fourth embodiment.

In the fourth embodiment, first, the substrate 402 such as flat glass is prepared which functions as a light-shielding-layer-side substrate as depicted in FIG. 8A. Next, as depicted in FIG. 8A, the light-shielding layer 500 such as an aluminum reflective layer is formed on one of the principal surfaces (in FIG. 8A, the upper surface) of the substrate 402. Electrodes such as ITO which serve as the control electrodes 406 are formed on the other principal surfaces (in FIG. 8A, the lower surface) of the substrate 402.

Thereafter, as depicted in FIG. 8B, the electrodes 406 are coated with a protective film 606 formed of a photosensitive material. Then, the openings 502 are patterned in the light-shielding layer 500 using a photo mask. Afterwards, as depicted in FIG. 8C, the protective film 606 is patterned using, as a mask, the photo mask instead of the light-shielding layer 500.

Next, as depicted in FIG. 8D, the light-shielding layer 500 is coated with a protective layer 608. Thereafter, as depicted in FIG. 8E, the electrodes 406 are etched using the protective layer 606 as a mask. Then, as depicted in FIG. 8F, the protective layer 606 and the protective layer 608 are removed. As the subsequent process, for example, the process in FIGS. 2E to 2I is used.

As described above, in the present embodiment, the light-shielding film and the control electrodes are patterned by exposing the opposite surfaces of the single substrate. This embodiment also enables the substrate 402 to be thinned.

(Fifth Embodiment)

Next, a fifth embodiment will be described. The fifth embodiment is an example in which the patterns of the openings and the control electrodes in the optical devices are changed. FIGS. 9A to 9F are schematic diagrams depicting pattern examples of the control electrodes 406. Although not depicted in FIGS. 9A to 9F, the openings 502 are formed so as to correspond to the control electrodes 406. However, the openings 502 need not necessarily have the same shape, and the shape of the openings 502 may be changed to one selected of the shapes depicted in FIGS. 9A to 9F. In any of the combinations, the control electrodes 406 are formed to allow the microlens array 400 to exhibit the lens function and then to align the focusing position with the central position of each opening 502.

Figure 9A:
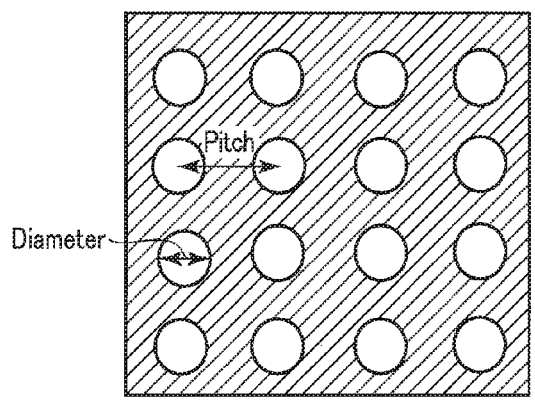
FIGS. 9A, 9B, 9C, 9D, 9E, and 9F are schematic diagrams depicting example patterns of openings
Figure 9B:
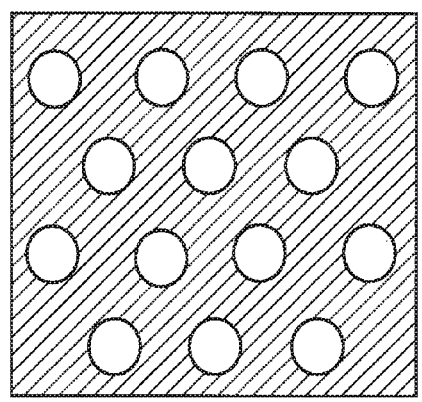

The openings are, for example, circular as depicted in FIG. 9A. Arrangement of the pixels in the video panel is commonly a square array. When the openings are in a square array, interference (moire) may occur. To suppress possible interference, the array of openings may be inclined at approximately 10° to the array of pixels in the video panel. To suppress possible interference, the openings may be in a hexagonal array (staggered array). The square array or the hexagonal array shown in FIG. 9B is easy to manufacture.

Figure 9C:
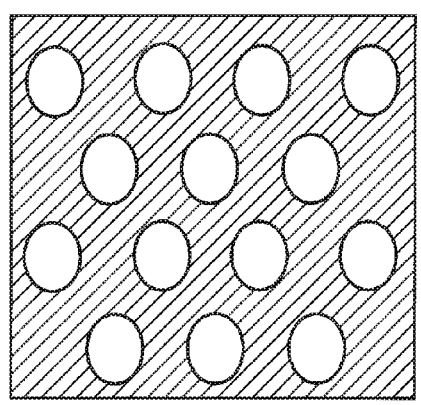
Figure 9D:
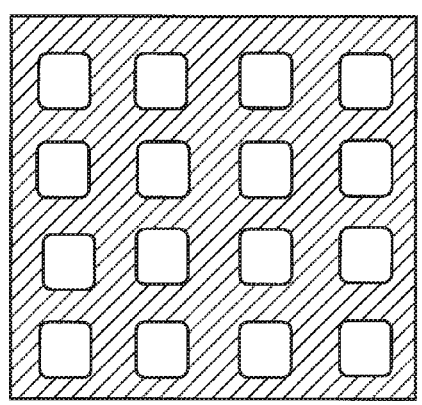
Figure 9E:
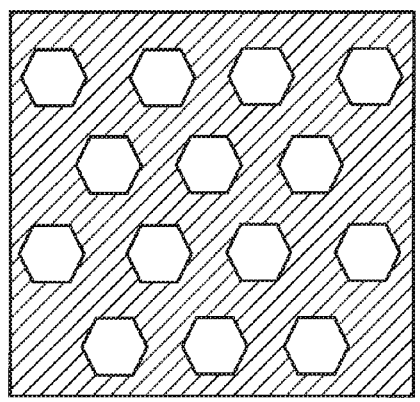

The shape of the openings is not limited to the circular shape. For example, an elliptic shape may be used as depicted in FIG. 9C. Besides the circular shape and the elliptic shape, a shape axially symmetric with respect to the array axis of the openings may be adopted. For example, for the square array, a rectangular shape as depicted in FIG. 9D may be adopted as the shape of the openings. For example, for the hexagonal array, a hexagonal shape as depicted in FIG. 9E may be adopted as the shape of the openings.

Figure 9F:
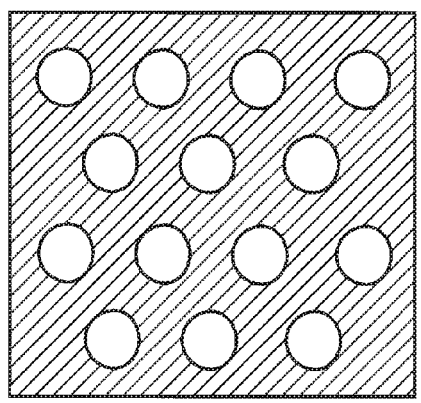

Moreover, as the shape of the control electrodes 406, a shape asymmetric with respect to symmetric axes of the array of openings as in FIG. 9F may be adopted depending on the alignment of the liquid-crystal molecules. FIG. 9F illustrates an elliptic shape having different ellipticities in a lateral direction with respect to a vertical orientation axis that is one of the symmetric axes of the array of openings. If the focusing position is shifted with the central position of each opening 502 when the microlens array 400 is allowed to exhibit the lens function, the openings may be shaped asymmetrically with respect to the symmetric axis of the array as depicted in FIG. 9F. A direction of the light emitted from the plurality of microlenses and being incident on the respective plurality of openings may be inclined to the direction perpendicular to the light-shielding layer.

As described above, in the present embodiment, the patterns of the openings and the control electrodes are set as needed to allow production not only of the effects of the above-described embodiments, but also of various effects corresponding to the patterns of the openings and the control electrodes.

(Sixth Embodiment)

Next, a sixth embodiment will be described. The sixth embodiment is an example where the liquid-crystal alignment for the liquid-crystal layer 410 is in accordance with the opening shape of the control electrodes in the optical device.

Figure 10A:
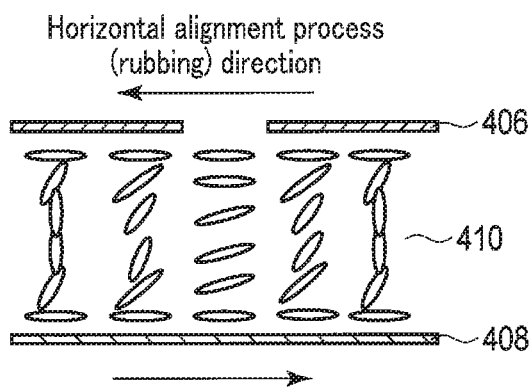
FIG. 10A is a diagram illustrating a liquid crystal layer in parallel alignment mode.
Figure 10B:
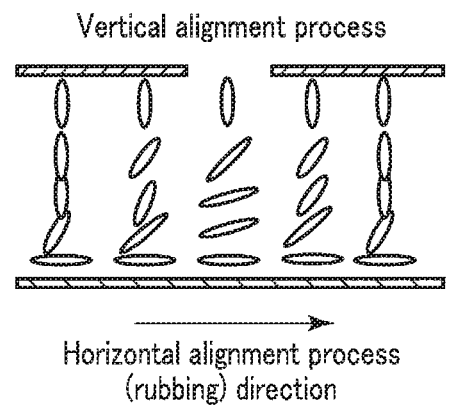
FIG. 10B is a diagram illustrating a liquid crystal layer in HAN mode.

In the above-described embodiments, a liquid-crystal alignment mode is desirably adopted in which liquid-crystal molecules arrange along a given orientation axis in the liquid-crystal layer 410 when the lens function is exhibited. As such a liquid-crystal alignment mode, a parallel alignment mode illustrated in FIG. 10A and a HAN mode illustrated in FIG. 10B are known. The parallel alignment mode is a mode in which horizontal alignment is used for initial alignment of the liquid-crystal molecules both on the light-shielding-layer-side substrate 402 and the panel-side substrate 404. In the HAN mode, horizontal alignment is used for one of the initial alignment of the liquid-crystal molecules in the light-shielding-layer-side substrate 402 and the initial alignment of the liquid-crystal molecules in the panel-side substrate 404 (in FIG. 10B, the panel-side substrate 404), whereas vertical alignment is used for the other (in FIG. 10B, the light-shielding-layer-side substrate). As is known, when the HAN mode is used, a possible alignment defect (disclination) during driving can be suppressed by using the vertical alignment for the side with the control electrodes 406, thus allowing in-plane orientation symmetry in the refractive-index distribution to be enhanced. However, the amount of modulation of the refractive index is approximately half that of the refractive index in the parallel alignment mode with the same liquid-crystal layer thickness.

As described above, the liquid-crystal alignment axis is desirably aligned with a transmission axis of the polarizer 300. FIGS. 11A to 11G are schematic distribution diagrams of the liquid-crystal molecules with the liquid-crystal alignment orientations near the openings 502 projected on the surface of the control electrodes. When the opening shape of the control electrodes 406 has directionality, the liquid-crystal alignment axis is desirably aligned with the orientation axis of the openings in the control electrodes 406.

For example, when the opening shape of the control electrodes 406 is elliptic, the liquid-crystal alignment axis is aligned with an elliptic minor axis as depicted in FIG. 11E, in accordance with the orientation characteristics of the refractive-index distribution in the liquid-crystal GRIN lens described below. If the opening shape of the control electrodes 406 has directionality, a shape asymmetric with respect to the central axis (vertical orientation axis) in the lateral direction is adopted, and a method inducing pretilt (as is the case with the rubbing process) is adopted for the liquid-crystal alignment process, then a flatter portion of the asymmetric shape (in this case, a portion with a smaller opening width in the horizontal direction) is desirably directed to a progress orientation of the alignment process (corresponding to a direction in which the liquid-crystal molecules rise up), as depicted in FIG. 11A and FIG. 11B.

When the opening shape of the control electrodes 406 is polygonal, the liquid-crystal alignment axis is made orthogonal to sides of the polygons as depicted in FIG. 11C and FIG. 11D, based on a concept similar to the concept for the case where the opening shape of the control electrodes 406 is elliptic. When the opening shape of the control electrodes 406 is polygonal, initial alignment defects and alignment defects occurring when the lens function is exhibited tend to be localized at a vertex portion of each of the openings formed in the control electrodes 406. This tendency may be used to arrange the liquid-crystal alignment axis on a diagonal of the control electrode 406 as depicted in FIG. 11F and FIG. 11G.

As described above, in the present embodiment, improvement of characteristics of the liquid-crystal GRIN lens such as improvement of the symmetry of the refractive-index distribution can be achieved by appropriately setting the relation between the liquid-crystal alignment mode and the shape of the control electrodes.

(Seventh Embodiment)

Now, a seventh embodiment will be described. The seventh embodiment is an example where the positional relation between the openings 502 and the control electrodes 406 is changed in accordance with the asymmetry of the refractive-index distribution generated in the liquid-crystal layer 410 in the optical device.

For example, when a parallel alignment is formed using the rubbing method, the direction of the rubbing process for the light-shielding-layer-side substrate 402 is opposite to the direction of the rubbing process for the panel-side substrate 404. When such a rubbing process is performed, pretilt occurs, that is, the liquid-crystal molecules rise up along the progress orientation of the rubbing process, even if no voltage is applied to the liquid-crystal layer 410.

Figure 12:
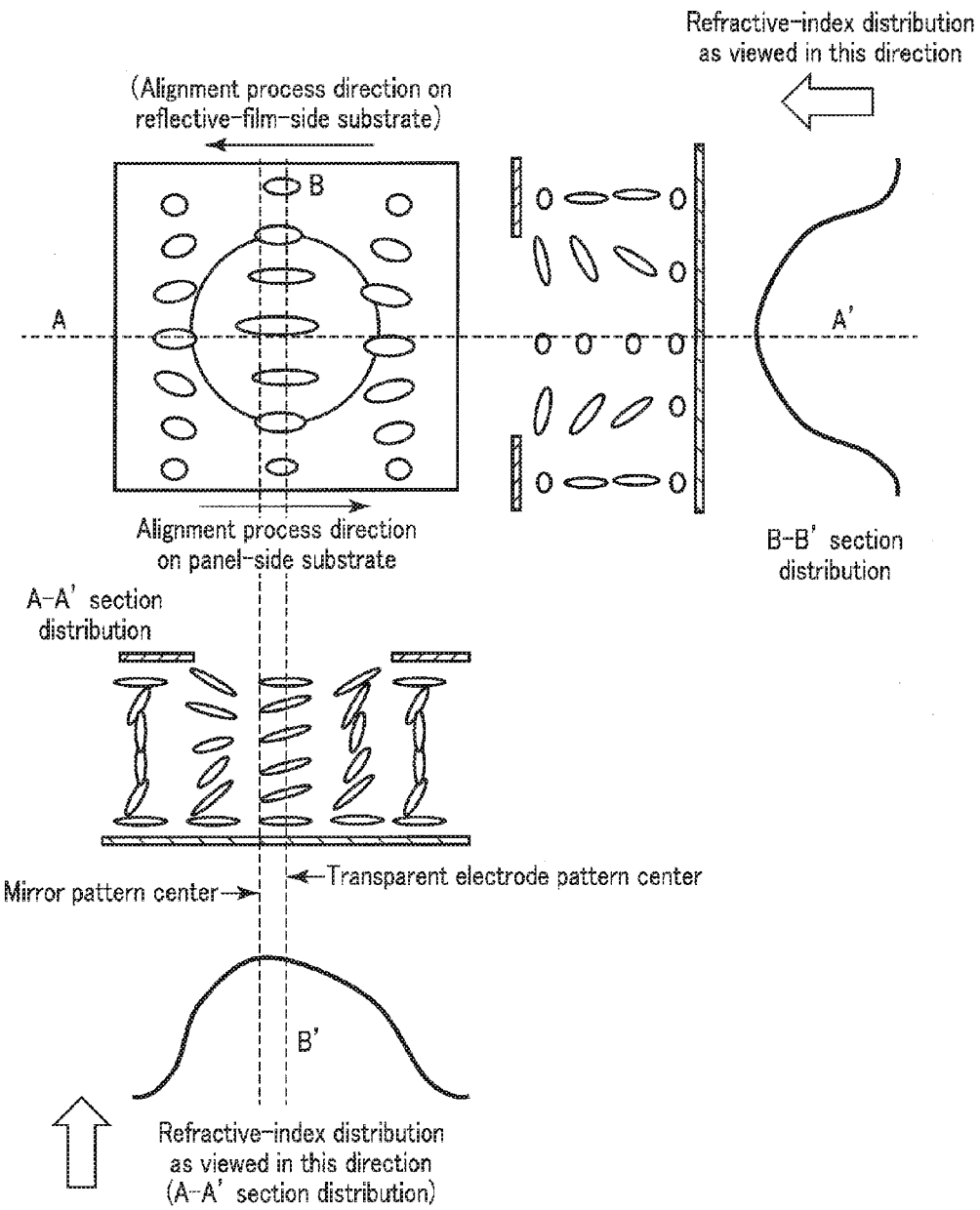
FIG. 12 is a diagram illustrating a relationship between an orientational distribution of liquid-crystal molecules and a refractive-index distribution established when a voltage is applied to a liquid-crystal layer in a parallel array.

FIG. 12 illustrates the relation between the orientation of the liquid-crystal molecules and the refractive-index distribution obtained when a voltage is applied to the liquid-crystal layer 410 in a parallel alignment mode. As depicted in FIG. 12, in a section parallel to a pretilt direction, that is, an A-A' section in FIG. 12, the direction of the pretilt (the direction of tilt occurring when the liquid-crystal molecules rise up) slopes upward on the right side. On the other hand, the direction of tilt of electric fields generated at ends of the control electrode 406 in the section slopes downward at the left end and upward at the right end. At one end of the control electrode 406 (the right end as viewed in the A-A' section; referred to as the forward-tilt-side end), the direction of tilt of the electric fields coincides with the direction of the pretilt. At another end of the control electrode 406 (the left end as viewed in the A-A' section; referred to as the backward-tilt-side end), the direction of tilt of the electric fields is opposite to the direction of the pretilt. FIG. 12 illustrates an example of the parallel alignment mode. However, the HAN mode also induces the forward-tilt-side end and the backward-tilt-side end as depicted in FIG. 12. However, in the HAN mode, the initial liquid-crystal alignment near the end is vertical alignment, and thus, a change in tilt angle is smaller than the change in tilt angle in the parallel alignment mode.

The liquid-crystal molecules near the forward-tilt-side end are likely to align with the tilt direction of the electric fields. The liquid-crystal molecules near the backward-tilt-side end need to lie along the electric fields after undergoing the horizontal alignment, and are thus difficult to align with the tilt direction of the electric fields. Thus, the easiness of alignment of the liquid-crystal molecules varies between the liquid-crystal molecules near the forward-tilt-side end and the liquid-crystal molecules near the backward-tilt-side end. Consequently, the refractive-index distribution in the liquid-crystal layer 410 is asymmetric when the lens function is exhibited. A position in the liquid-crystal layer 410 where the refractive index is maximized is shifted from the center of the opening in the control electrodes 406 toward the backward-tilt-side end. Thus, the focal position obtained when the microlens array 400 exhibits the lens function is also shifted from the center of the opening in the control electrode 406.

Such a phenomenon is more significant with increasing the diameter of each of the openings in the control electrodes 406 and with increasing the thickness of the liquid-crystal layer 410. When the focusing position (in the vicinity of the focal position) fails to coincide with the central position of each opening 502 when the microlens array 400 exhibits the lens function, light emitted from the microlens array 400 may be eclipsed by the wall surface of the opening 502. To suppress such eclipse, the positional relation between the control electrodes 406 and the openings 502 is desirably set with the asymmetry of the refractive-index distribution taken into account. If the amount of shift of the focal position resulting from the asymmetry of the refractive-index distribution exceeds an acceptable error, the position of the opening 502 is desirably shifted so that the central position of the opening 502 align with the focusing position of the liquid-crystal GRIN lens. The positions of the control electrodes 406 may be shifted from the positions of the openings 502.

As described above, in the present embodiment, the light emitted from the microlens array 400 can be efficiently emitted through the openings 502 by setting the positional relation between the control electrodes 406 and the openings 502 according to the asymmetry of the refractive index.

(Eighth Embodiment)

Next, an eighth embodiment will be described. FIG. 13 is a diagram schematically depicting a display device serving as an application example of an optical device according to the eighth embodiment. A display device 100 in the eighth embodiment comprises a video panel 200, a polarizer 300, a microlens array 400, and a light-shielding layer 500 as is the case with the first to seventh embodiments. The video panel 200, the polarizer 300, the microlens array 400, and the light-shielding layer 500 are laminated together in this order. The video panel 200 is driven by a panel driving circuit 204. The microlens array 400 is driven by a lens driving circuit 416. In the present embodiment, a tilt sensor 506 is provided. The tilt sensor 506 detects a tilt from a front orientation of the display device 100. The front orientation is, for example, a normal orientation of a display surface of the video panel 200 obtained when the display device 100 is placed so as to face front, and also corresponds to a normal orientation of a principal surface of an optical device 600.

Figure 14A:
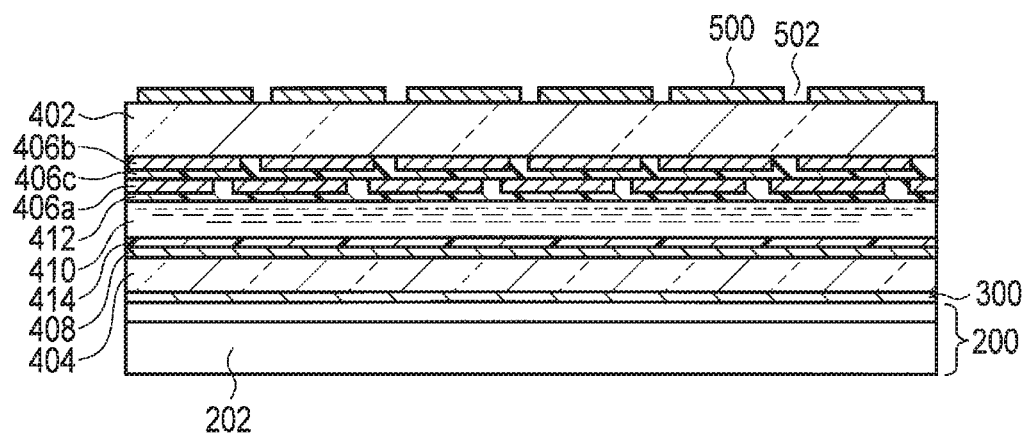
FIG. 14A is a sectional view of a display device 100 with a first lamination configuration according to the eighth embodiment.

FIG. 14A is a sectional view of the display device 100 with a first laminate configuration according to the eighth embodiment. In the first laminate configuration depicted in FIG. 14A, a control electrode 406 is divided into a control electrode 406a and a control electrode 406b. The control electrode 406a and the control electrode 406b are laminated together via an insulating layer 406c. Separate voltages are applied to the control electrode 406a and the control electrode 406b. In FIG. 14A, the control electrode 406a and the control electrode 406b have substantially the same opening shape as that of openings 502. The opening centers of the control electrode 406a and the control electrode 406b are shifted with the opening center of the corresponding opening 502. The opening center of the control electrode 406a is shifted with the opening center of the control electrode 406b. The remaining part of the configuration is similar to the corresponding part in FIGS. 2A to 2I and will thus not be described.

Figure 14B:
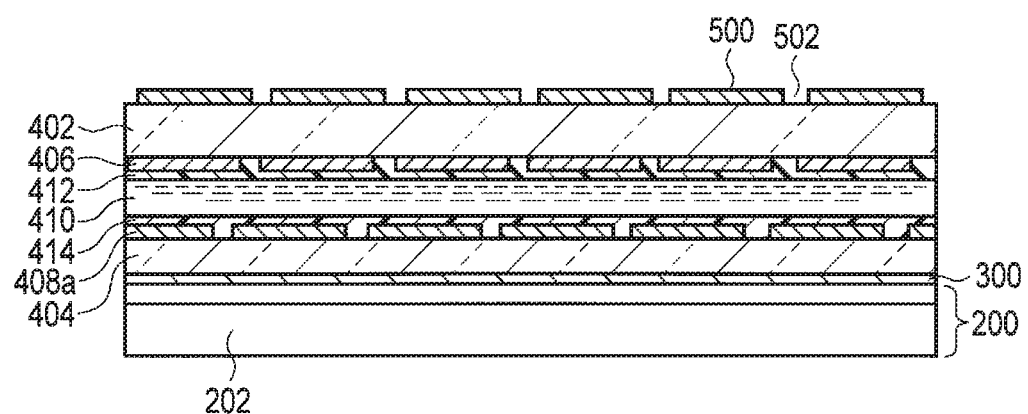
FIG. 14B is a sectional view of the display device 100 with a second lamination configuration according to the eighth embodiment.

FIG. 14B is a sectional view of the display device 100 with a second laminate configuration according to the eighth embodiment. In the second laminate configuration depicted in FIG. 14B, a common electrode 408a is not a surface electrode but is a pattern electrode with an opening similar to the opening in the control electrode 406. Also, in FIG. 14B, the control electrode 406 and the common electrode 408a have substantially the same opening shape as that of the openings 502. The opening centers of the control electrode 406 and the common electrode 408a are shifted with the opening center of the corresponding opening 502. The opening centers of the control electrode 406 and the common electrode 408a are shifted with each other. The remaining part of the configuration is similar to the corresponding part in FIGS. 2A to 2I and will thus not be described.

Figure 15A:
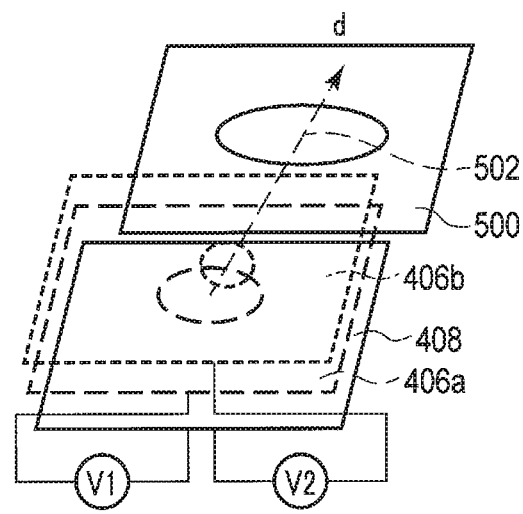
FIGS. 15A and 15B are schematic diagrams illustrating a relation between layout of openings and a maximum-luminance orientation in the display device according to the eighth embodiment.
Figure 15B:
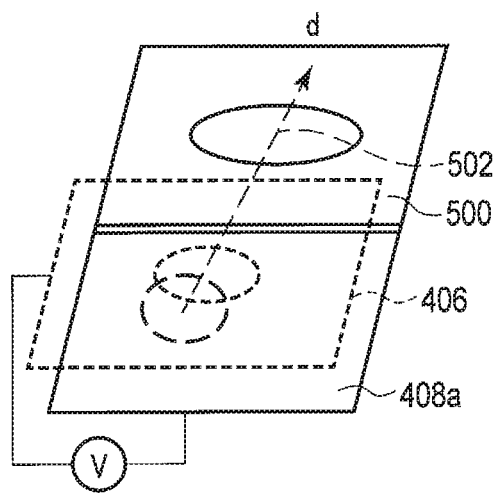
Figure 16:
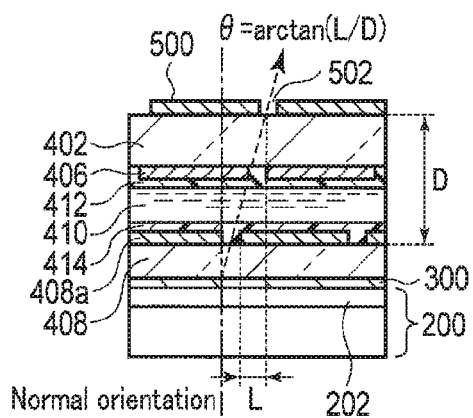
FIG. 16 is a diagram depicting an interlayer distance and a lateral distance between openings.

FIG. 15A and FIG. 15B are schematic diagrams illustrating the relation between the front orientation and the maximum luminance orientation of the display device 100 according to the eighth embodiment. FIG. 15A corresponds to a schematic diagram of the first laminate configuration depicted in FIG. 14A. FIG. 15B corresponds to a schematic diagram of the second laminate configuration depicted in FIG. 14B. As depicted in FIG. 15A, in the first laminate configuration, the centers of the opening patterns of the control electrode 406a, the control electrode 406b, and the opening 502 are substantially aligned in a straight line. The orientation d of the straight line is inclined to the front orientation (the normal orientation of the display surface of the video panel 200). Similarly, as depicted in FIG. 15B, in the second laminate configuration, the centers of the opening patterns of the common electrode 408a, the control electrode 406, and the opening 502 are substantially aligned in a straight line. The orientation d of the straight line is inclined to the front orientation (the normal orientation of the display surface of the video panel 200).

In the laminate configurations depicted in FIG. 15A and FIG. 15B, the emission intensity of rays emitted when a voltage is applied to the liquid-crystal layer 410 is highest along a direction along the orientation d. When an angle subtended between the front orientation and the maximum luminance orientation of outgoing light is represented as θ, θ is calculated based on Expression 2.

$$\theta = \arctan(L/D) \quad \text{Expression 2}$$

D in Expression 2 denotes an interlayer distance that is a distance between the formation position of the light-shielding layer 500 and the formation position of a common electrode 408a (in the first laminate configuration, the control electrode 406a). L denotes an opening center pitch that is a distance between the center of the opening 502 and the center of the opening in the pattern electrode (in the first laminate configuration, the control electrode 406a and in the second laminate configuration, the common electrode 408a).

Figure 17A:
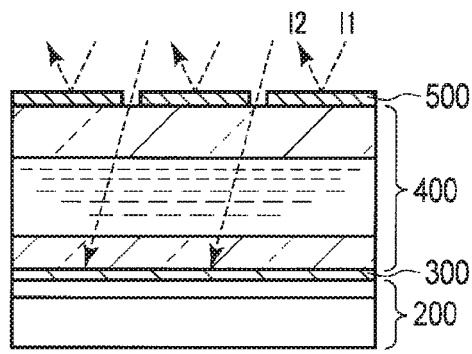
FIGS. 17A, 17B, and 17C are diagrams illustrating an operation performed by the display device according to the eighth embodiment with no image displayed on a video panel of the display device.
Figure 17B:
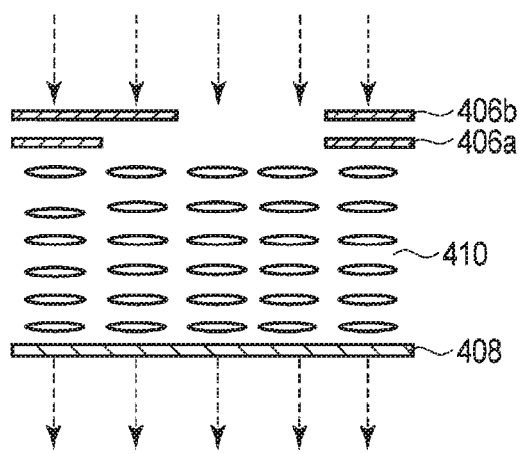
Figure 17C:
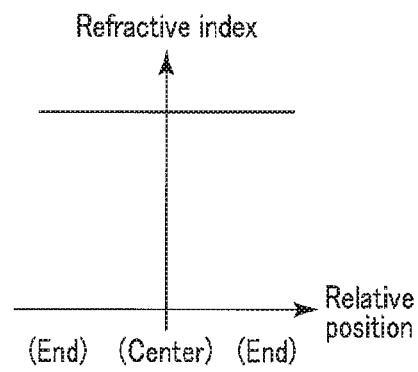

FIGS. 17A to 17C are diagrams illustrating an operation of the display device 100 according to the eighth embodiment with no image displayed on the video panel 200. FIGS. 17A to 17C illustrate an example of the operation for the first laminate configuration, but a similar operation is performed for the second laminate configuration.

As depicted in FIG. 17A, rays 11 from the exterior of the display device 100 are mostly reflected by a surface of the light-shielding layer 500, and only a small number of rays 12 having passed through the openings 502 enter the interior of the display device 100.

Also in the present embodiment, when no image is being displayed on the video panel 200, no voltage is applied to the liquid-crystal layer 410. FIG. 17B is a schematic diagram of a section of the liquid-crystal layer 410 obtained when no voltage is applied. FIG. 17C is a diagram illustrating the refractive-index distribution inside the liquid-crystal layer 410. As depicted in FIG. 17B, the liquid-crystal layer 410 is aligned in one direction when no voltage is applied. Therefore, as depicted in FIG. 17C, the refractive-index distribution in the liquid-crystal layer 410 is uniform. In this state, the rays 12 having entered the liquid-crystal layer 410 travel straight ahead as depicted in FIG. 17A. With no image displayed on the video panel 200, the rays 12 having passed through the openings 502 travel straight ahead through the liquid-crystal layer 410 and are then absorbed by the polarizer 300 or trapped inside the display device 100 where the rays 12 are subjected to multiple reflections and attenuated. Therefore, the openings 502 become very small black regions and are not perceived by the viewer.

Figures 18A, 18B:
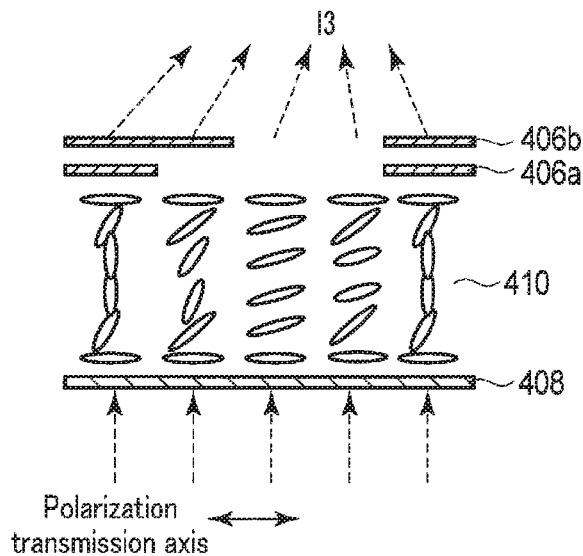
FIGS. 18A and 18B are diagrams illustrating an operation performed by a display device with a first lamination configuration according to the eighth embodiment with an image displayed on the video panel of the display device.
Figures 19A, 19B:
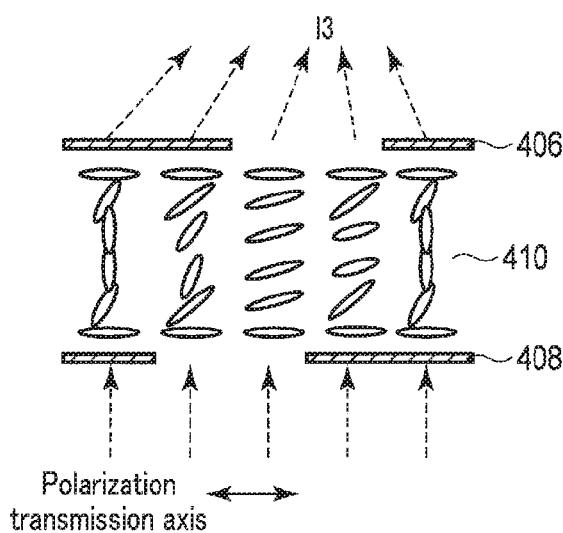
FIGS. 19A and 19B are diagrams illustrating an operation performed by a display device with a second lamination configuration according to the eighth embodiment with an image displayed on the video panel of the display device.

FIG. 18A and FIG. 18B are diagrams illustrating an operation of the display device 100 with the first laminate configuration according to the eighth embodiment with an image displayed on the video panel 200. FIG. 19A and FIG. 19B are diagrams illustrating an operation of the display device 100 with the second laminate configuration according to the eighth embodiment with an image displayed on the video panel 200. In the present embodiment, when an image is displayed on the video panel 200, a voltage is applied to the liquid-crystal layer 410 so as to guide, to the openings, as many rays emitted through the display surface of the video panel 200 as possible. FIG. 18A and FIG. 19A are schematic diagrams of a section of the liquid-crystal layer 410 observed when a voltage is applied. FIG. 18B and FIG. 19B are diagrams illustrating the refractive index inside the liquid-crystal layer 410.

When the liquid-crystal layer 410 has a positive dielectric anisotropy, an intensity of vertical electric field is lower immediately below the openings than in comparison to the periphery of the control electrodes 406, 406*a*, and 406*b* because no control electrode is formed immediately below the openings. Thus, the liquid-crystal molecules immediately below the openings 502 maintain a substantially horizontal orientation. On the other hand, the liquid-crystal molecules around the openings 502 are aligned under the effect of electric fields formed between the common electrode 408 and the control electrodes 406.

In the eighth embodiment, the centers of the opening pattern are arranged on an inclined straight line, and thus, the refractive-index distribution deviates with respect to a central axis (an axis directed in the front orientation and passing through the opening center of the openings 502) as depicted in FIG. 19A and FIG. 19B. Consequently, as depicted in FIG. 18B and FIG. 19B, rays 13 emitted through the openings 502 are tilted to the central axis. The tilt changes according to the magnitude of the voltage applied to the liquid-crystal layer 410, that is, the refractive-index distribution formed by the liquid-crystal layer 410. Such a refractive-index distribution in the liquid-crystal layer 410 causes the rays 13 having entered the liquid-crystal layer 410 to be refracted so as to be biased in the liquid-crystal layer 410 and to converge toward the openings 502 arranged such that the center of each of the openings 502 is positioned on extensions of the emitted rays.

Figure 20A:
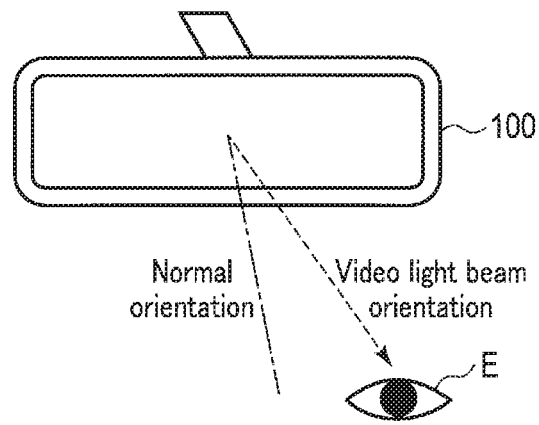
FIGS. 20A and 20B are diagrams depicting an application example of the display device according to the eighth embodiment.
Figure 20B:
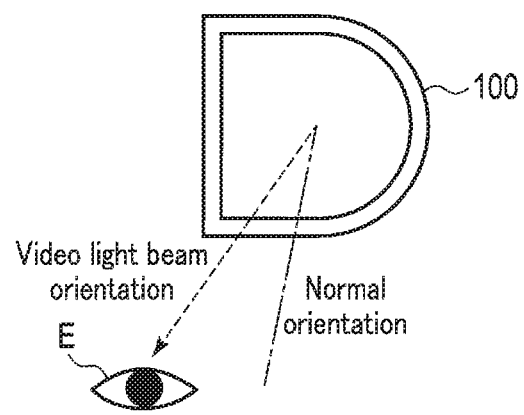

FIG. 20A and FIG. 20B are diagrams of an application example of the display device 100 according to the eighth embodiment. FIG. 20A is a diagram illustrating an example where the display device 100 is applied to a rearview mirror mounted in a vehicle. FIG. 20B is a diagram illustrating an example where the display device 100 is applied to a side mirror mounted in the vehicle. FIG. 20A and FIG. 20B illustrate examples where the whole rearview mirror or the whole side mirror is the display device 100. In contrast, a part of the rearview mirror or a part of the side mirror may be provided with an information display area.

For the rearview mirror or the side mirror, image rays must be allowed to enter the viewer's (normally the driver's) eyes, but the viewer's eyes are normally not located in front of the display device 100. Thus, for the rearview mirror or the side mirror, the emission orientation of image rays needs to be different from the normal orientation of the display surface.

In the display device 100 in the present embodiment, the emission orientation of image rays may be tilted with respect to the normal orientation of the display surface. Thus, image rays with high luminance can be allowed to enter the viewer's eye E. Moreover, image rays with high luminance can be allowed to enter the viewer's eye E regardless of a change in the direction of the display device 100 by controlling the magnitude of the voltage applied to the liquid-crystal layer 410 according to the tilt detected by the tilt sensor 506, that is, the refractive-index distribution formed in the liquid-crystal layer 410. When the light-shielding layer surface is a polarizing mirror as an anti-glare mirror, a wave plate is effectively provided under the light-shielding layer in order to adjust a polarizing axis for emitted light.

(Ninth Embodiment)

Figure 21A:
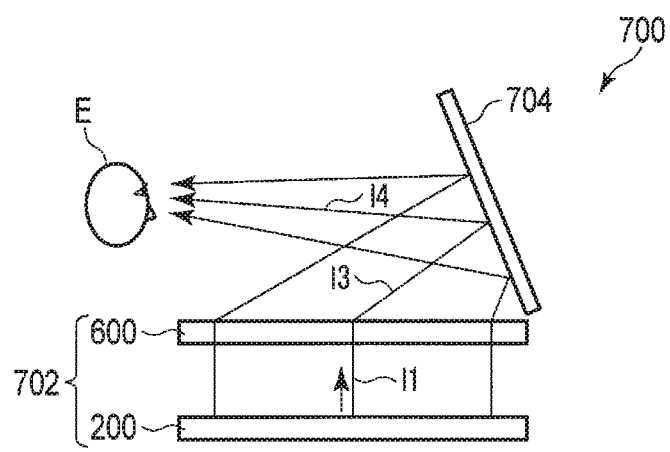
FIGS. 21A and 21B are diagrams depicting an example of a display device according to a ninth embodiment.
Figure 21B:
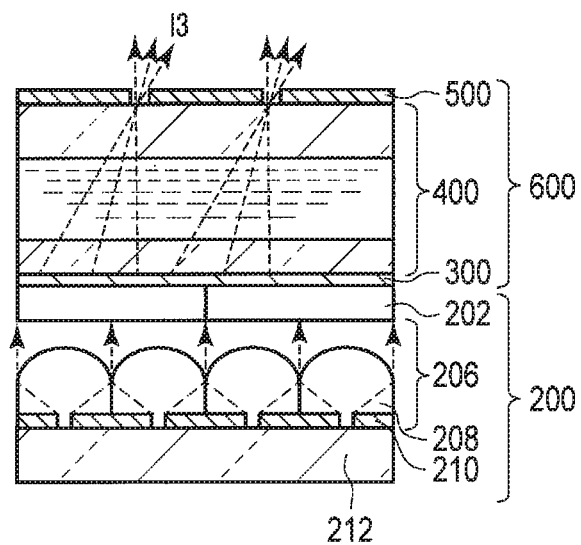

Next, a ninth embodiment will be described. FIGS. 21A and 21B are diagrams illustrating an example where any of the optical devices according to the first to eighth embodiments is applied to a head-up display.

A display device 700 comprises a video device 702 and a transreflective device 704 to provide information to one eye E of the viewer. As depicted in FIG. 21A, rays 13 emitted from the video device 702 are reflected by the transreflective device 704 so as to enter the one eye E of the viewer. On the other hand, the viewer can view the front orientation via the transreflective device 704. Thus, the desired information can be superimposed on a front viewing image.

The video device 702 comprises a video panel 200 and an optical device 600. FIG. 21B is a sectional view depicting the video panel 200 and the optical device 600 according to the ninth embodiment.

The optical device 600 is any of the optical devices illustrated in the first to eighth embodiments (the illustrated example is the optical device in the eighth embodiment).

The video panel 200 comprises pixels 202, a lens array element 206, and a backlight unit 212. The pixel 202 is, for example, a liquid-crystal pixel and comprises a pixel electrode, a common electrode arranged opposite to the pixel electrode, and a liquid-crystal layer sandwiched between the pixel electrode and the common electrode. The lens array element 206 comprises a collimator lens 208 and a light-shielding layer 210. One or more collimator lenses 208 are arranged for one pixel 202 to convert tilted rays emitted through openings defined by the light-shielding layer 210 into parallel rays in the front orientation. The collimator lenses 208 allow rays from the backlight unit 212 to efficiently enter the pixels 202. Thus, display quality is improved. The backlight unit 212 is a light source such as LEDs that irradiate back surfaces of the pixels 202 with, for example, white light.

The transreflective device 704 has a partially reflective surface on a front surface thereof to reflect incident light. The transreflective device 704 may be configured, for example, to be able control the effect of external light. For this purpose, the transreflective device 704 comprises, for example, a layer of a photochromic material or an electrochromic material or a neutral gray filter. The transreflective device 704 may be configured to enhance the reflectance of incident light or to enhance only the reflectance of rays emitted from the video device 702. For this purpose, the transreflective device 704 may comprise a selective reflective film corresponding to the spectrum of rays emitted from the video device 702, for example, a translucent metal layer or a dielectric semiconductor layer.

In a display device 700 depicted in FIG. 21A and FIG. 21B, emitted light 11 from the video panel 200 is polarized and focused by the optical device 600. Emitted light 13 from the optical device 600 is reflected by the transreflective device 704. Resultant reflected beams 14 enter the one eye E of the viewer to form an image. The voltage of the optical device 600 is modulated to enable a presented image to be adjusted.

As described above, in the present embodiment, light from the video panel 200 can be allowed to enter only one eye of the viewer using the optical device 600 and without using a complicated optical system. Time-division switching or the like may be performed to present both eyes of the viewer with a parallax image, and distance information may be added to the parallax image. In this case, the optical device 600 switches a modulation state for driving so as to allow light to enter the eye corresponding to the parallax image.

(Tenth Embodiment)

Figure 22C:
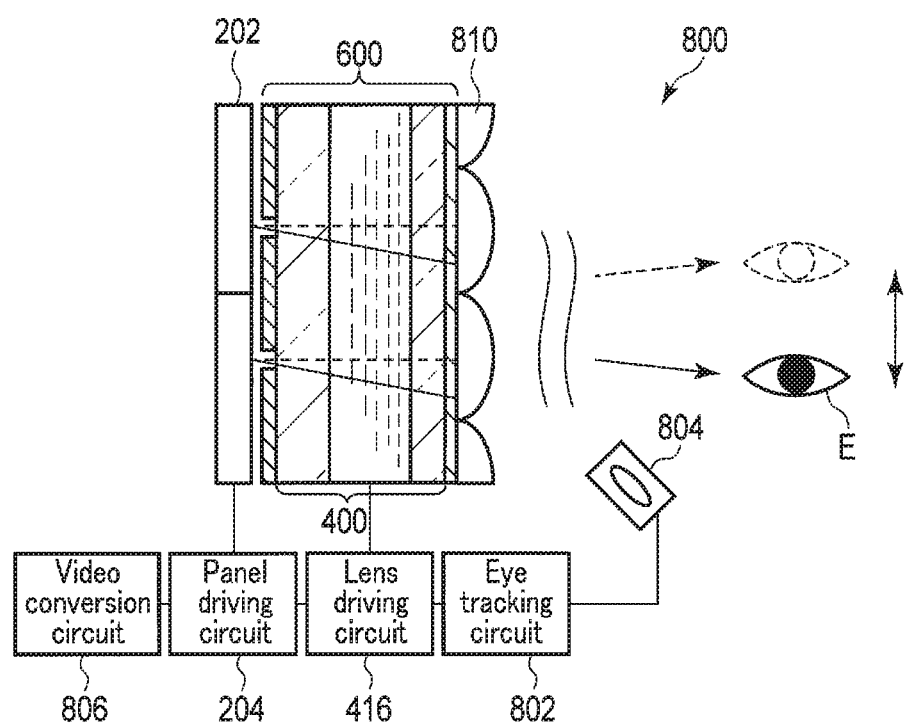
FIG. 22C is a diagram depicting a third example of the display device according to the tenth embodiment.

Now, a tenth embodiment will be described. FIGS. 22A to 22C are diagrams illustrating an example where any of the optical devices according to the first to eighth embodiments is applied to a display device with a compound-eye optical system that is a type of light field display. FIG. 22A illustrates a first example, FIG. 22B illustrates a second example, and FIG. 22C illustrates a third example.

A display device 800 in the first example comprises a video panel (only pixels 202 are depicted in FIGS. 22A to 22C), an optical device 600, a panel driving circuit 204, a lens driving circuit 416, an eye tracking circuit 802, an eye tracking sensor 804, and a video conversion circuit 806.

Each of the pixels 202 is, for example, a liquid-crystal pixel and comprises a pixel electrode, a common electrode arranged opposite to the pixel electrode, and a liquid-crystal layer sandwiched between the pixel electrode and the opposite electrode. The pixels 202 are driven by the panel driving circuit 204. Although not depicted in FIG. 22A, when the pixels 202 are liquid-crystal pixels, a backlight unit is arranged at back surfaces of the pixels 202. Such a lens array element as described in the ninth embodiment may be installed.

The optical device 600 is any of the optical devices illustrated in the first to eighth embodiments. FIG. 22A illustrates an example where a side of the optical device 600 that is closer to a light-shielding layer is arranged opposite to the video panel. As described above, the optical device 600 is driven by the lens driving circuit 416.

The eye tracking circuit 802 detects the viewer's gaze direction based on a detection result from the eye tracking sensor 804. The eye tracking sensor 804 is, for example, an image sensor, and acquires images of the viewer's eye E. The eye tracking circuit 802 detects the viewer's gaze direction based on, for example, the position of the pupil in an image of the eye E obtained by the eye tracking sensor 804.

The video conversion circuit 806 converts an image to be presented to the viewer into a compound image by reducing the presented image in size and placing the resultant image in association with a center of a microlens (lenslet) in a miscrolens array in the optical device 600.

In the display device 800 depicted in FIG. 22A, the video conversion circuit 806 generates a compound image from a presented image. An image with a plurality of compound images arranged therein is displayed on the pixels 202. Upon passing through openings defined by the light-shielding layer in the optical device 600, rays corresponding to the compound images displayed on the pixels 202 are split into rays corresponding to the respective openings. The orientations of the resultant individual rays are controlled in accordance with the viewer's gaze direction detected by the eye tracking circuit 802. For example, when the emission orientations of the image rays are controlled so as to superimpose the compound images on one another, a virtual image similar to the presented image is incident on the viewer's eye E. When the emission orientations of the image rays are controlled so as to set parallaxes between the compound images, different compound images are incident on the respective eyes E of the viewer. Thus, the viewer recognizes depth information on the presented image.

As described above, the display device in the present embodiment can switch between the state where a virtual image is presented to the viewer and the state where no virtual image is presented to the viewer. When such a display device is applied to, for example, a wearable terminal such as a pair of eyeglasses, a virtual image can be presented to the viewer only when needed To improve the image quality of a peripheral area of a presented image presented to the viewer, an optical system for eyepiece 808 may be arranged on a ray emission surface side of the optical device 600.

As depicted in FIG. 22C, a fixed microlens array 810 may be arranged on the emission surface side of the optical device 600. In this configuration, an ocular system is provided by a compound lens array including the fixed microlens array 810 and a microlens array 400 provided in the optical device 600. For a pattern matching relation between the fixed microlens array 810 and the microlens array 400, a lens pitch is desirably adjusted so as to substantially align imaging centers with one another. This configuration enables an imaging position to be adjusted by controlling the voltage applied to the microlens array 400 with respect to virtual-image display presented by the pixels 202 and the fixed microlens array 810.

(Eleventh Embodiment)

Next, an eleventh embodiment will be described. FIG. 23 illustrates an example where any of the optical devices illustrated in the first to eighth embodiments is applied to a tensor 3D display that is a type of light field display. A display device 900 comprises pixels 202a, an optical device 600, pixels 202b, a lens array element 206, and a backlight unit 212. In the example in FIG. 23, an image including a plurality of pieces of parallax information is displayed on two layers of pixels including the pixels 202a and the pixels 202b so that the image is split into images arranged in the respective layers. Image rays emitted from the pixels 202a are controlled for every opening formed in the optical device 600. The orientations of the individual rays are controlled by a liquid-crystal layer 410 in the optical device 600. Controlling the emission orientations of the image rays for every plurality of parallaxes makes different parallax images incident on the respective eyes E of the viewer in a superimposed manner. Consequently, a three-dimensional image comprising a plurality of parallax rays is presented to the viewer.

As described above, in the present embodiment, display quality in 3D display can be improved by displaying parallax images resulting from splitting on the two layers of pixels, while controlling the orientations of the image rays emitted from the pixels in one of the layers.

(Twelfth Embodiment)

Next, a twelfth embodiment will be described. FIG. 24 is a diagram illustrating an example where any of the optical devices disclosed in the first to eighth embodiments is applied to a laser scanning display.

A display device 1000 comprises a laser scanning mechanism 902, pixels 202, an optical device 600, and a screen 904.

The laser scanning mechanism 902 comprises a laser light source and a mechanical system such as a rotary mirror. The laser scanning mechanism 902 typically emits rays while performing scans at a frequency of approximately 1 kHz. The pixels 202 are, for example, liquid-crystal pixels. The optical device 600 is any of the optical devices in the first to eighth embodiments. The optical device 600 is arranged between the laser scanning mechanism 902 and the screen 904. The optical device 600 is used to synthesize, on the screen 904, rays emitted from the pixels 202 to average changes in luminance attributed to speckles inherent in laser light beams in order to suppress flicker. When the optical device 600 is an optical device according to one of the first to seventh embodiments, the degree of the synthesis is adjusted by regulating the focal position of the rays. When the optical device 600 is an optical device according to the eighth embodiment, an in-plane position on the screen 904 can also be adjusted.

As described above, the present embodiment enables display without flicker attributed to speckles inherent in laser light beams.

(Thirteenth Embodiment)

Next, a thirteenth embodiment will be described. FIG. 25A is a diagram illustrating an example where any of the optical devices disclosed in the first to eighth embodiments is applied to a head mounted display device. FIG. 25B is a diagram depicting a head mounted display device in a modification.

A display device 1100 depicted in FIG. 25A comprises a support section 1102, a display section 1104, an eye tracking sensor 1106, and a control section 1108.

The support section 1102 is a member that supports the display section 1104. For example, a string is formed on the support section 1102 and used to mount the display device 1100 on the viewer's head. The support section 1102 supports the display section 1104 so as to position the display section 1104 near the viewer's eye E when the display device 1100 is mounted on the viewer's head. This structure enables the viewer to look into the display section 1104.

The display section 1104 is supported by the support section 1102 and comprises a video panel 200 and an optical device 600. The video panel 200 and the optical device 600 have a laminate structure, and is connected to the control section 1108 positioned so as not to hinder viewing. The video panel 200 is, for example, any of the video panels illustrated in the first to eighth embodiments. The optical device 600 is any of the optical devices described in the first to eighth embodiments (the example in FIG. 25A is the optical device illustrated in the eighth embodiment).

The eye tracking sensor 1106 is, for example, the eye tracking sensor 804 as illustrated in FIG. 22A and FIG. 22C and detects the viewer's gaze direction. The eye tracking sensor 1106 detects the viewer's gaze direction, for example, in an image obtained by an imaging section.

The control section 1108 comprises a panel driving circuit 204, a lens driving circuit 416, an eye tracking circuit 802, and a video conversion circuit 806 as depicted in FIG. 22A and FIG. 22C to control operations of the video panel 200, the optical device 600, and the eye tracking sensor 1106.

In this configuration, the display device 1100 is driven by power supplied from a battery not depicted in the drawings to present a virtual image in front of the viewer. Parallaxes are set for images viewed by the viewer's right eye ER and left eye EL to achieve 3D display. In this case, a position where the virtual image is presented is adjusted by interlocking display content for both eyes on the video panel 200 with the imaging distance of the optical device 600. For example, the display section 1104 may be divided into lateral pieces with respect to the viewer so that the resultant pieces consecutively display images in the right eye ER and the left eye EL. Alternatively, the entire panel or a central section between a right and a left visual regions where the right and left visual regions overlap may be alternately used for display in the right eye ER and in the left eye EL for a given period of time.

The display device 1100 depicted in FIG. 25B is an example where individual display sections 1104a and 1104b are assigned to the right eye ER and the left eye EL, respectively. The display section 1104a comprises a video panel 200a and an optical device 600a. The display section 1104b comprises a video panel 200b and an optical device 600b. The video panel 200a and the optical device 600a are connected to a control section 1108a. The video panel 200b and the optical device 600b are connected to a control section 1108b. The video panel 200a and the video panel 200b may have the same structure. The optical device 600a and the optical device 600b may also have the same structure. The display device 1100 depicted in FIG. 25B comprises an eye tracking sensor 1106a for the right eye ER and an eye tracking sensor 1106b for the left eye EL.

A method for driving the display sections 1104a and 1104b is equivalent to the method used in the configuration in FIG. 25A in which the display section 1104 is divided into lateral pieces. In FIG. 25B, a monocular display device can be configured exclusively using the display section for one eye.

A microlens array 400 provided in the optical device 600 functions as a variable microlens array. That is, the microlens array 400 has a focal distance that can be changed by voltage control. Thus, a diopter scale is adjusted by changing the focal distance along with the image displayed on the video panel 200 in conjunction with the gaze directions of both eyes detected by the eye tracking sensor 1106 (or the eye tracking sensors 1106a and 1106b). For example, an eccentricity can be changed by voltage control based on a control electrode pattern in the optical device 600 designed as depicted in FIG. 14A, FIG. 14B, FIG. 15A, FIG. 15B, and FIG. 16. When the eccentricity is changed along with the displayed image in conjunction with the gaze directions of both eyes, individual differences in inter-eye distance are adjusted. For example, in conjunction with the gaze directions of both eyes, both the focal distance and the eccentricity are coordinately changed by voltage control along with the image displayed on the video panel 200 to enable a reduction in variance between convergence and adjustment in vision. For example, when the control electrode pattern in the lens section (of a microlens or lenslet) is designed for correcting optical aberration with reference to a pattern described in JP. Pat. Appln. KOKAI Publication No. 2006-057738, the in-plane distribution shape of the refractive index is adjusted by voltage control to allow astigmatism to be corrected. The contents of this document are incorporated herein by reference.

(Other Modifications)

Other modifications of the above-described embodiments will be described. In the embodiments, the optical device 600 is applied to the display device. In actuality, the optical device 600 is not necessarily applied to the display device. For example, the optical device 600 may be applied to an imaging device by being combined with an image sensor instead of the video panel 200. As described above, the display device is configured so that the optical device 600 deflects light emitted from the video panel 200. On the other hand, the imaging device is configured so that the image sensor receives an image formed by the optical device 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
a light-shielding layer including a plurality of openings; and
a microlens array divided into a plurality of microlenses corresponding to the respective plurality of openings, a refractive index of the microlens array being variable so that light is incident on the microlenses is focused on the respective plurality of openings, the microlens array comprising:
control electrodes formed so as to correspond to the openings for the respective microlenses;
a common electrode arranged opposite to the control electrodes; and
a liquid-crystal layer sealed between the common electrode and the control electrodes,
wherein a refractive index of the liquid-crystal layer is changed according to a voltage applied by the control electrodes and the common electrode,
wherein a portion where light is focused includes a central position of the corresponding opening.

2. The optical device according to claim 1, wherein a direction of the light emitted from the plurality of microlenses and being incident on the respective plurality of openings is inclined to the direction perpendicular to the light-shielding layer.

3. The optical device according to claim 1, wherein the refractive index for one of the plurality of microlenses being variable independently.

4. The optical device according to claim 3, further comprising a tilt sensor configured to detect a tilt of the optical device,
wherein the refractive index is varied according to the tilt detected by the tilt sensor.

5. The optical device according to claim 1, wherein the liquid-crystal layer is an ultraviolet-curing liquid-crystal layer, and alignment in the liquid-crystal layer is controlled by irradiation with ultraviolet rays.

6. The optical device according to claim 1, wherein each of the openings has a circular shape, an elliptic shape, or a shape symmetric with reference to an array of the openings.

7. The optical device according to claim 1, wherein each of the openings has an elliptic shape,
each of the control electrodes has an opening shaped to correspond to each of the openings, and
an alignment axis for liquid-crystal molecules in the liquid-crystal layer coincides with an elliptic minor axis of the opening in each of the control electrodes.

8. The optical device according to claim 1, wherein the openings are arranged in a square array or a hexagonal array.

9. The optical device according to claim 1, wherein the microlens array is a gradient index microlens array.

10. A head mounted display device comprising:
the optical device according to claim 1; and
a video panel formed at a back surface of the microlens array to allow image rays to enter the optical device.

11. An imaging device comprising:
the optical device according to claim 1; and
an image sensor configured to receive light beams emitted from the optical device.

12. The head mounted display device according to claim 10, wherein the liquid-crystal layer is an ultraviolet-curing liquid-crystal layer, and alignment in the liquid-crystal layer is controlled by irradiation with ultraviolet rays.

13. The head mounted display device according to claim 10, wherein each of the openings has a circular shape, an elliptic shape, or a shape symmetric with reference to an array of the openings.

14. The head mounted display device according to claim 10, wherein the openings are arranged in a square array or a hexagonal array.

15. The head mounted display device according to claim 10, wherein the microlens array is a gradient index microlens array.

16. The imaging device according to claim 11, wherein the liquid-crystal layer is an ultraviolet-curing liquid-crystal layer, and alignment in the liquid-crystal layer is controlled by irradiation with ultraviolet rays.

17. The imaging device according to claim 11, wherein each of the openings has a circular shape, an elliptic shape, or a shape symmetric with reference to an array of the openings.

18. The imaging device according to claim 11, wherein the openings are arranged in a square array or a hexagonal array.

19. The imaging device according to claim 11, wherein the microlens array is a gradient index microlens array.

* * * * *